(12) United States Patent
Hamdi

(10) Patent No.: US 10,645,102 B2
(45) Date of Patent: *May 5, 2020

(54) SYSTEMS AND METHODS FOR COMPUTER ENVIRONMENT SITUATIONAL AWARENESS

(71) Applicant: Acentium Inc., Boston, MA (US)

(72) Inventor: Amine Hamdi, Boston, MA (US)

(73) Assignee: Acentium Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/222,573

(22) Filed: Dec. 17, 2018

(65) Prior Publication Data

US 2019/0141063 A1 May 9, 2019

Related U.S. Application Data

(63) Continuation of application No. 15/339,437, filed on Oct. 31, 2016, now Pat. No. 10,158,654.

(51) Int. Cl.
*G06F 11/00* (2006.01)
*H04L 29/06* (2006.01)
(Continued)

(52) U.S. Cl.
CPC ...... *H04L 63/1416* (2013.01); *G06F 11/3055* (2013.01); *G06F 11/3058* (2013.01);
(Continued)

(58) Field of Classification Search
CPC ............. G06F 11/3055; G06F 11/3058; G06F 16/951; G06F 21/552; G06F 21/577;
(Continued)

(56) References Cited

U.S. PATENT DOCUMENTS

| 7,028,228 B1 | 4/2006 | Lovy et al. |
|---|---|---|
| 7,167,683 B2 | 1/2007 | Chen |

(Continued)

FOREIGN PATENT DOCUMENTS

| EP | 1 362 289 | 1/2012 |
|---|---|---|
| WO | WO-2006/032045 A2 | 3/2006 |

OTHER PUBLICATIONS

Final Office Action on U.S. Appl. No. 15/339,437 dated Jun. 28, 2018.

(Continued)

*Primary Examiner* — Samson B Lemma
(74) *Attorney, Agent, or Firm* — Foley & Lardner LLP

(57) ABSTRACT

Systems and methods for monitoring states of operation of a computer environment can include one or more computer servers identifying a target asset of the computer environment and establishing a communication link with a computing device associated with the target asset. The one or more computer servers can determine a first set of parameters for profiling the target asset, transmit a first query for the first set of parameters to the computing device via the communication link, and receive one or more first parameter values corresponding to the first set of parameters responsive to the query. The one or more computer servers can compare the one or more first parameter values to one or more first criteria or threshold values, an determine a state of operation of the target asset based on the comparison. The state of operation can be indicative of an abnormal behavior associated with the target asset.

20 Claims, 19 Drawing Sheets

(51) Int. Cl.
| | |
|---|---|
| *G06F 16/951* | (2019.01) |
| *H04L 12/26* | (2006.01) |
| *H04L 29/08* | (2006.01) |
| *G06F 11/30* | (2006.01) |
| *G06F 21/55* | (2013.01) |
| *H04L 12/24* | (2006.01) |
| *G06F 21/57* | (2013.01) |

(52) U.S. Cl.
CPC .......... *G06F 16/951* (2019.01); *G06F 21/552* (2013.01); *G06F 21/577* (2013.01); *H04L 41/0853* (2013.01); *H04L 43/0817* (2013.01); *H04L 63/1425* (2013.01); *H04L 67/30* (2013.01)

(58) Field of Classification Search
CPC ............. H04L 63/0817; H04L 63/1416; H04L 41/0853; H04L 67/30
USPC ......................................................... 726/22
See application file for complete search history.

(56) References Cited

U.S. PATENT DOCUMENTS

| | | | |
|---|---|---|---|
| 7,167,863 B2 | 1/2007 | Ellis et al. | |
| 7,546,602 B2 | 6/2009 | Hejlsberg et al. | |
| 8,479,297 B1 | 7/2013 | Edukulla et al. | |
| 8,725,853 B2* | 5/2014 | Sellers | H04L 41/0213 709/223 |
| 8,813,236 B1* | 8/2014 | Saha | H04L 63/1408 726/22 |
| 9,240,976 B1 | 1/2016 | Murchison | |
| 9,516,053 B1* | 12/2016 | Muddu | G06F 16/254 |
| 2004/0088412 A1* | 5/2004 | John | G06F 16/40 709/226 |
| 2006/0259695 A1 | 11/2006 | Sohm et al. | |
| 2006/0265751 A1 | 11/2006 | Cosquer et al. | |
| 2007/0067846 A1 | 3/2007 | McFarlane et al. | |
| 2008/0235758 A1 | 9/2008 | Hsiung | |
| 2010/0192228 A1 | 7/2010 | Levi | |
| 2010/0275263 A1 | 10/2010 | Bennett et al. | |
| 2012/0185945 A1 | 7/2012 | Andres et al. | |
| 2013/0333045 A1 | 12/2013 | Shigemoto et al. | |
| 2015/0278729 A1* | 10/2015 | Hu | G06Q 10/0635 705/7.28 |
| 2016/0294603 A1 | 10/2016 | Whitner | |
| 2017/0344484 A1 | 11/2017 | Pack, III | |

OTHER PUBLICATIONS

International Search Report and Written Opinion for PCT/US2017/059095 dated Feb. 21, 2018, 13 pages.
International Search Report and Written Opinion for PCT/US2017/059098 dated Mar. 5, 2018.
International Search Report and Written Opinion on PCT/US20017/059097 dated Feb. 16, 2018.
Non-Final Office Action on U.S. Appl. No. 15/339,412 dated Jun. 15, 2018.
Non-Final Office Action on U.S. Appl. No. 15/339,424 dated Nov. 30, 2018.
Notice of Allowance on U.S. Appl. No. 15/339,412 dated Jan. 24, 2019.
Notice of Allowance on U.S. Appl. No. 15/339,412 dated Nov. 29, 2018.
Notice of Allowance on U.S. Appl. No. 15/339,437 dated Oct. 10, 2018.
Notice of Allowance on U.S. Appl. No. 15/339,437 dated Nov. 7, 2018.
Notice of Allowance on U.S. Appl. No. 15/863,100 dated Aug. 30, 2018.
Notice of Allowance on U.S. Appl. No. 15/863,100 dated Nov. 30, 2018.
U.S. Office Action on U.S. Appl. No. 15/339,437 dated Feb. 26, 2018.
Final Office Action on U.S. Appl. No. 15/339,424 dated Apr. 19, 2019.
International Preliminary Report on Patentability for PCT/US2017/059095 dated May 9, 2019.
Non-Final Office Action on U.S. Appl. No. 16/403,694 dated Jul. 29, 2019.
Notice of Allowance on U.S. Appl. No. 15/339,412 dated Mar. 13, 2019.
Notice of Allowance on U.S. Appl. No. 15/339,424 dated Jul. 15, 2019.

* cited by examiner

| CEMM System | Qualys | Rapid 7 | CVE | MSFT | FBI | DHS |
|---|---|---|---|---|---|---|
| 10011 | 4404 | 3217 | CVE-2015-0110 | MS15-034 | -------- | 14151 |
| 10012 | -------- | 3218 | CVE-2015-0111 | -------- | -------- | -------- |
| 10013 | 4405 | -------- | CVE-2015-0112 | -------- | -------- | -------- |

SYSTEMS AND METHODS FOR COMPUTER ENVIRONMENT SITUATIONAL AWARENESS

CROSS-REFERENCE TO RELATED APPLICATION

This application is a continuation of and claims priority to U.S. application Ser. No. 15/339,437 filed on Oct. 31, 2016, entitled "SYSTEMS AND METHODS FOR COMPUTER ENVIRONMENT SITUATIONAL AWARENESS," the disclosure of which is incorporated herein by reference.

FIELD OF THE DISCLOSURE

The present application relates generally to systems and methods for monitoring and managing the cyber security and health (e.g., robustness) of a computer environment. Specifically, the present application relates to methods and system for assessing states of operation of assets of the computer environment.

BACKGROUND

Most institutions rely on their computer systems with regard to executing daily business operations. In particular, government institutions, corporations, financial institutions, hospitals, universities, nonprofit organizations and/or other businesses can use their computer systems to maintain and manage business data, execute transactions or offered services, automate processes, machines or devices, or provide communications platforms. For instance, power grids, medical devices, and/or manufacturing machinery can be automated via computer systems. Also, financial institutions execute transactions with their customers or other institutions electronically. Furthermore, business records, archives, customer information, or other business related data are now stored electronically.

The functional importance and business value of computer systems for respective institutions and their customers call for reliable security of such computer systems. Many institutions spend substantial amounts of money and resources to secure their computer systems from intruders, hackers, viruses and/or other threats, and to comply with local regulations pertaining to securing computer systems. For instance, computer systems employ firewalls, antivirus and malware protection software, data encryption, secure communication channels, and/or other cyber security measures. However, the increased complexity of many computer systems and/or the increasingly sophisticated cyber security threats make many computer systems vulnerable even when such measures are employed.

SUMMARY

According to one aspect, a system for monitoring states of operation of assets in a network of computer devices comprise one or more servers communicatively coupled to a computer network. The one or more servers can include a controller engine configured to identify a target asset of the computer network. The one or more servers can include an asset profiling engine configured to establish a communication link with a computing device associated with the target asset. The asset profiling engine can determine a first set of parameters for profiling the target asset, transmit a first query for the first set of parameters to the computing device via the communication link, and receive one or more first parameter values corresponding to the first set of parameters, via the communication link, responsive to the query. The asset profiling engine can compare the one or more first parameter values to one or more first criteria or threshold values, and determine a state of operation of the target asset based on comparing the one or more first parameter values to the one or more first criteria or threshold values. The state of operation can be indicative of an abnormal behavior associated with the target asset.

According to one other aspect, a method of monitoring states of operation of assets in a network of computer devices can include a controller engine identifying a target asset of the computer network. The method can include an asset profiling engine establishing a communication link with a computing device associated with the target asset, and determining a first set of parameters for profiling the target asset. The asset profiling engine can transmit, via the communication link, a first query for the first set of parameters to the computing device, and receive, via the communication link, one or more first parameter values corresponding to the first set of parameters responsive to the query. The method can also include the asset profiling engine comparing the one or more first parameter values to one or more first criteria or threshold values, an determining a state of operation of the target asset based on comparing the one or more first parameter values to the one or more first criteria or threshold values. The state of operation can be indicative of an abnormal behavior associated with the target asset.

According to another aspect, a computer-readable medium can include computer code instructions stored thereon, which when executed by one or more processors, cause the one or more processors to identify a target asset of a computer network and establish a communication link with a computing device associated with the target asset. The one or more processors can determine a first set of parameters for profiling the target asset, transmit, via the communication link, a first query for the first set of parameters to the computing device, and receive, via the communication link, one or more first parameter values corresponding to the first set of parameters responsive to the query. The one or more processors can compare the one or more first parameter values to one or more first criteria or threshold values, and determine a state of operation of the target asset based on comparing the one or more first parameter values to the one or more first criteria or threshold values, the state of operation indicative of an abnormal behavior associated with the target asset.

BRIEF DESCRIPTION OF THE DRAWINGS

FIGS. 4A and 4B show a diagram and a table, respectively, illustrating an embodiment of mapping similar cyber security data items from various data sources to one another.

DETAILED DESCRIPTION

For purposes of reading the description of the various embodiments below, the following descriptions of the sections of the specification and their respective contents may be helpful:

Section A describes a computing and network environment which may be useful for practicing embodiments described herein.

Section B describes an embodiment of a computer environment monitoring and management (CEMM) system architecture.

Section C describes systems and methods for situational awareness assessment.

Section D describes systems and methods for monitoring and managing vulnerability.

Section E describes systems and methods for a multi-layered cache used to display data.

A. Computing and Network Environment

Figure 1A:
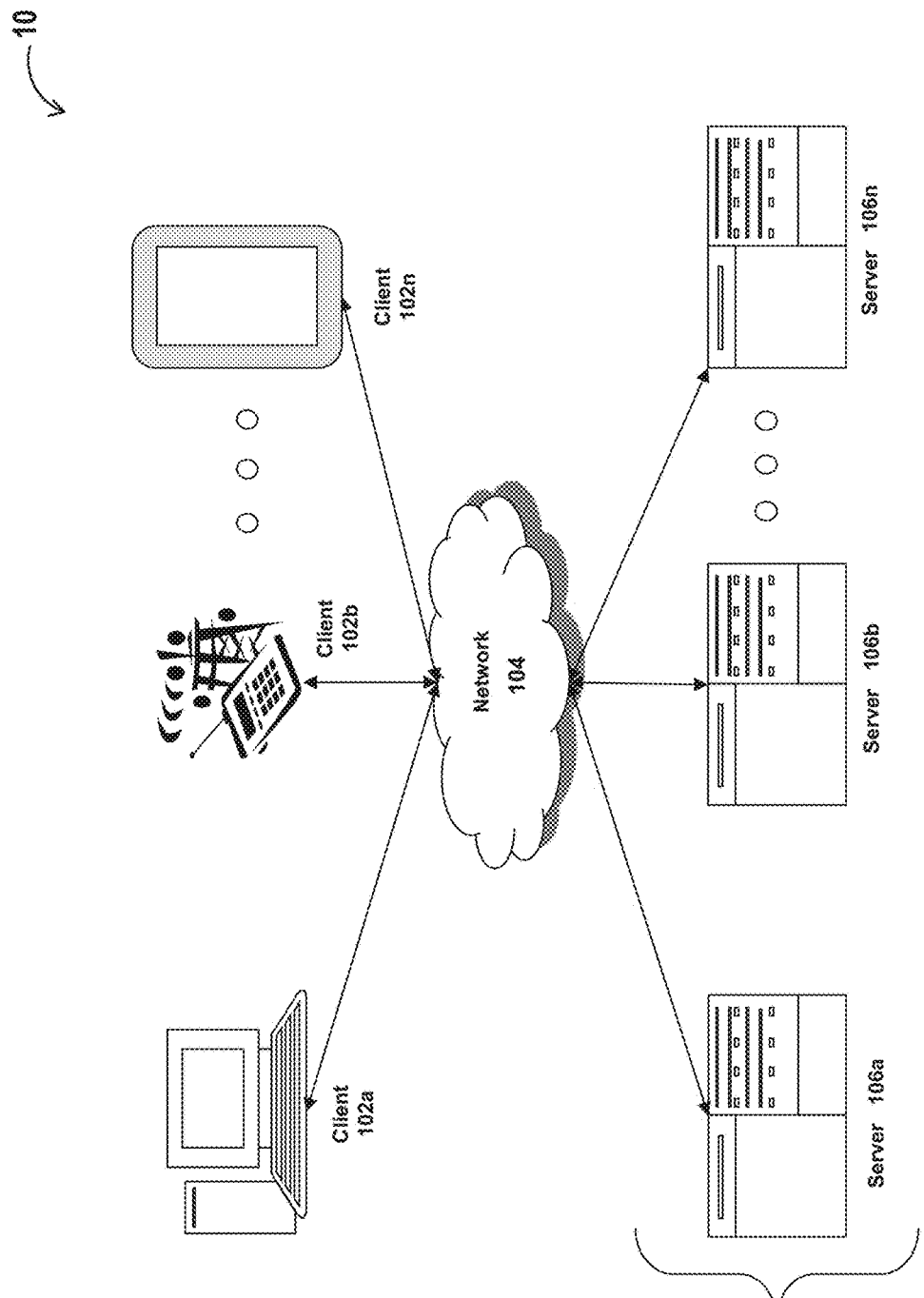
FIG. 1A is a block diagram depicting an embodiment of a computing and network environment.

In addition to discussing specific embodiments of the present solution, it may be helpful to describe aspects of the operating environment as well as associated system components (e.g., hardware elements) in connection with the methods and systems described herein. Referring to FIG. 1A, an embodiment of a computing and network environment 10 is depicted. In brief overview, the computing and network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 1G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the computing and network environment 10 may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS 8 or 10, manufactured by Microsoft Corp. of Redmond, Wash.), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, firewall, Internet of Things (IoT) controller. In one embodiment, the server 106 may be referred to as a remote machine or a node. In another embodiment, a plurality of nodes 290 may be in the path between any two communicating servers.

Figure 1B:
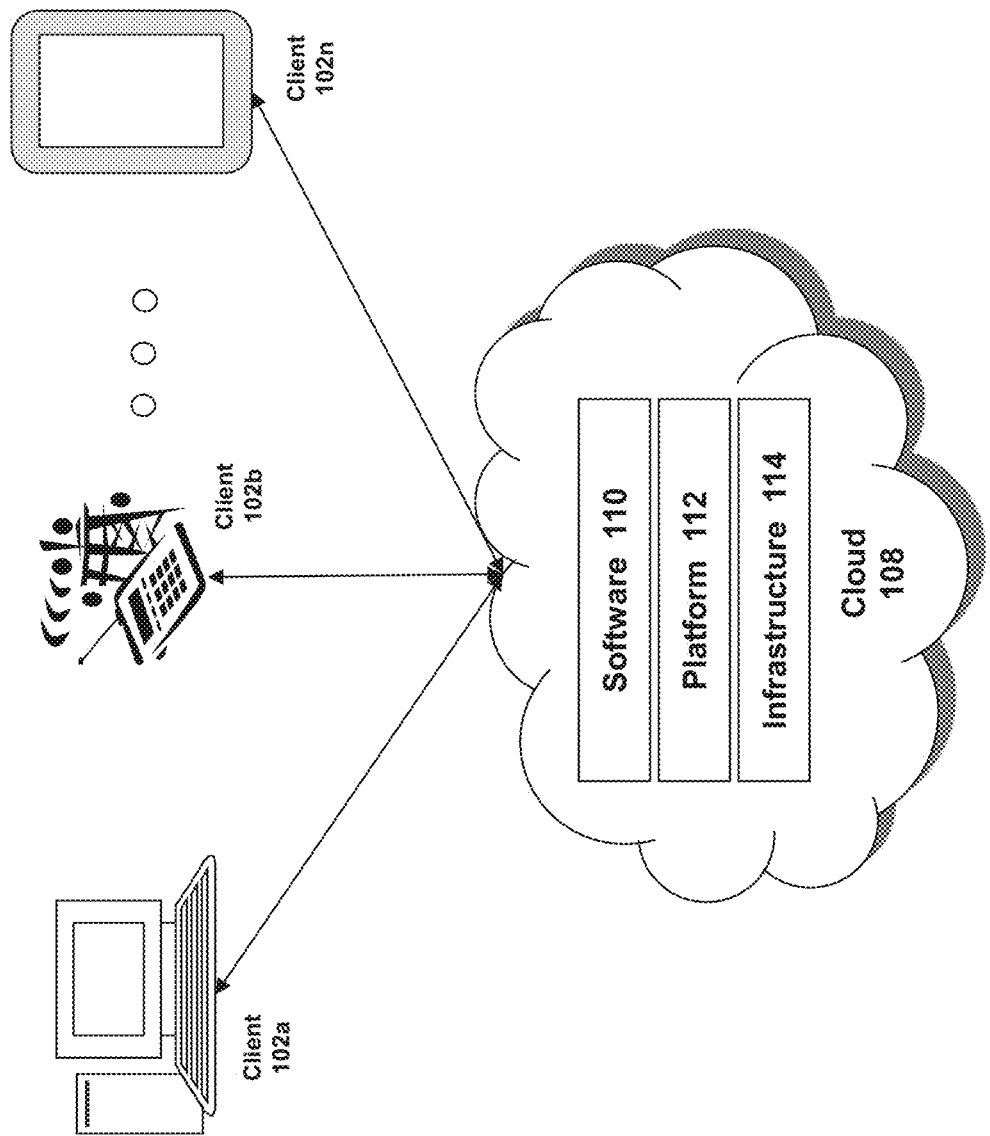
FIGS. 1B-1D are block diagrams depicting embodiments of computers useful in connection with the methods and systems described herein.

Referring to FIG. 1B, a cloud computing environment is depicted. The cloud computing environment can be part of the computing and network environment 10. A cloud computing environment may provide client 102 with one or more resources provided by the computing and network environment 10. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 102 may also access SaaS resources through smartphone or tablet applications, including, for example, Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
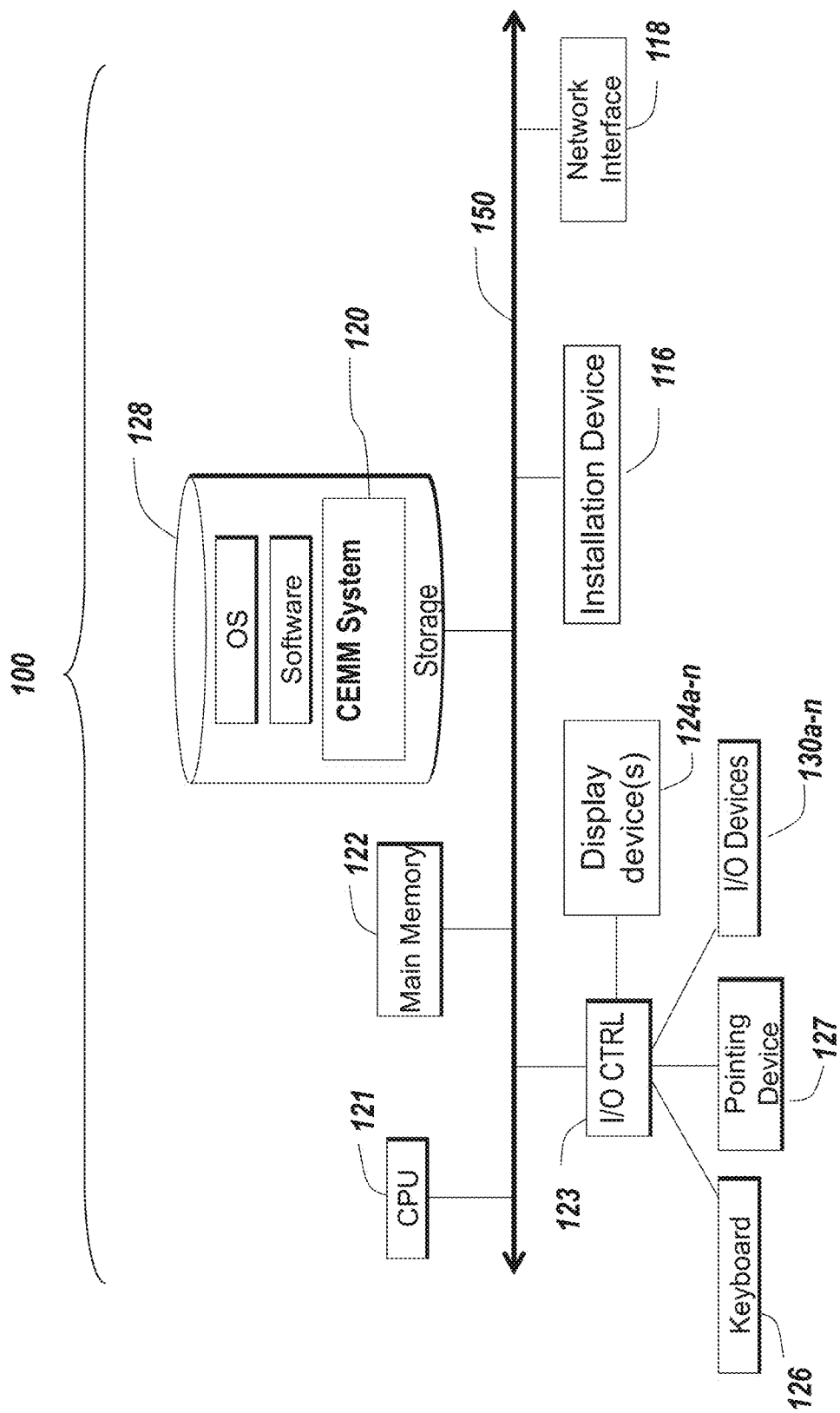
Figure 1D:
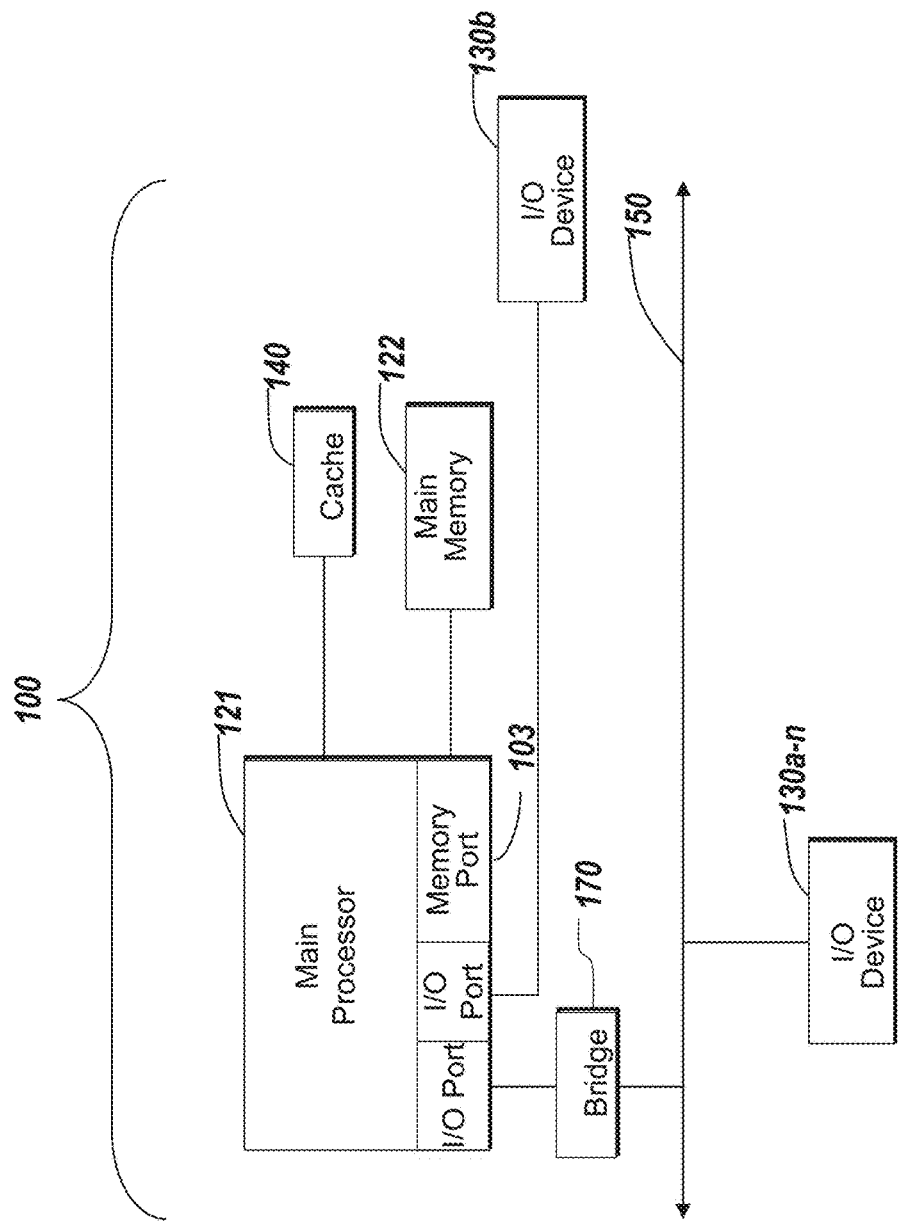

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, software, and a software of a computer environment monitoring and management (CEMM) system 120. As shown in FIG. 1D, each computing device 100 may also include additional optional elements, e.g. a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5 and INTEL CORE i7.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the software for the computer environment monitoring and management (CEMM) system 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via a I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Wash.

In some embodiments, the computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is a eBook reader, e.g. the KINDLE family of devices by Amazon.com, or NOOK family of devices by Barnes & Noble, Inc. of New York City, N.Y.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, central processing unit (CPU) and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Computer Environment Monitoring and Management System Architecture

The present disclosure relates to systems and methods for monitoring and managing the cyber security posture (or status) as well as the robustness of a computer environment (also referred to herein as cyberspace or information system), such as the computing and network environment 10. Computer environments can be vulnerable to a variety of cyber security breaches or threats such as network outage, unauthorized access to data, intrusive tempering with software or hardware assets, hacking, computer viruses, misconfiguration of software or hardware assets, service disruption, service misdirection, or the like. Cyber threats or attacks can jeopardize the availability and credibility of data stored in computer environments, can disrupt services provided by the computer environments, or can cause irreparable damage to the infrastructure of the computer environments. Since most institutions, such as government institutions, corporations, financial institutions, hospitals, universities, nonprofit organizations and other businesses, rely extensively on their computer systems in handling their day-to-day business, attacks on their computer systems can lead to business disruption, legal violations, significant monetary loss and/or customer dissatisfaction.

The volume and sophistication of cyber-attacks on networked computer systems have been growing. According to a recent survey conducted by cyber security firm EY, about 88% of global organizations don't believe their online defenses are good enough to meet their needs. Also, according to a research report published by Fortune® Magazine in January, 2015, cyber-attacks had cost companies more than 300 billion U.S. dollars over a twelve month period. The volume and severity of cyber-attacks calls for sophisticated solutions for protecting networked computer systems from cyber threats and cyber-attacks. In particular, cyber security threats can be multi-dimensional, for example, by targeting stored data, software, services, and/or computer environment infrastructure. Also, cyber threats or cyber-attacks can be continuous or repetitive, from various sources, or in various forms. For example, cyber threats can lead to jamming of communication resources, unlawful access of data or storage resources, draining computational resources and/or misconfiguration of hardware or software assets. As such, reliable protection of computer environments calls for comprehensive techniques that continuously monitor and manage a multitude of aspects or parameters of a computer environment that contribute to the cyber security posture of that computer environment.

Furthermore, as computer environments become more complex in terms of the number and variety of hardware assets, the number and variety of software assets, compliance requirements, business requirements and/or legal requirements, continuous monitoring of a multitude of parameters associated with large number of hardware and software assets may be computationally burdensome. Specifically, monitoring a large number of computer assets can involve collecting and analyzing large amounts of data. Also, the number and complexity of system requirements, such as business, legal and/or compliance requirements, can increase the complexity of data analysis involved in monitoring and managing computer environments.

According to one aspect, a computer environment monitoring and management (CEMM) system can be configured to monitor and/or manage assets of a computer environment with regard to availability, vulnerabilities, risks, utilization, stress level, configuration or architectural specifications, or a combination thereof. The CEMM system can be customized to monitor and/or manage other aspects of the computer environment or respective assets. As used herein, an asset of the computer environment, can include one or more hardware devices (e.g., a computer device, a server, a server rack, a portable device, a communication device or appliance, a chip, etc.), one or more software modules, a hardware platform, a software platform, an operating system, a database, a data file (or data set) stored in the computer environment, or a combination thereof. In some implementations, a number of assets can be nested such that one or more assets are components of another asset. For example, a chip or a software application can be assets which are part of a computer server asset. The CEMM system can be configured to collect various sets of data related to the computer environment using vulnerability scanners, external databases, network discovery (or asset profiling) techniques, user input, or a combination thereof. By collecting or monitoring various sets of data pertaining to the computer environment, the CEMM system can provide comprehensive and real-time assessments of the security posture and the state of health (e.g., in terms of stress level, configuration, resource usage, connectivity or a combination thereof) of assets of the computer environment. The CEMM system can provide efficient and relatively fast visualization of collected and/or assessment data via a variety of visual representations. The CEMM system can allow for visualization of data in real time (e.g., immediately after it is received by the CEMM system).

Figure 2:
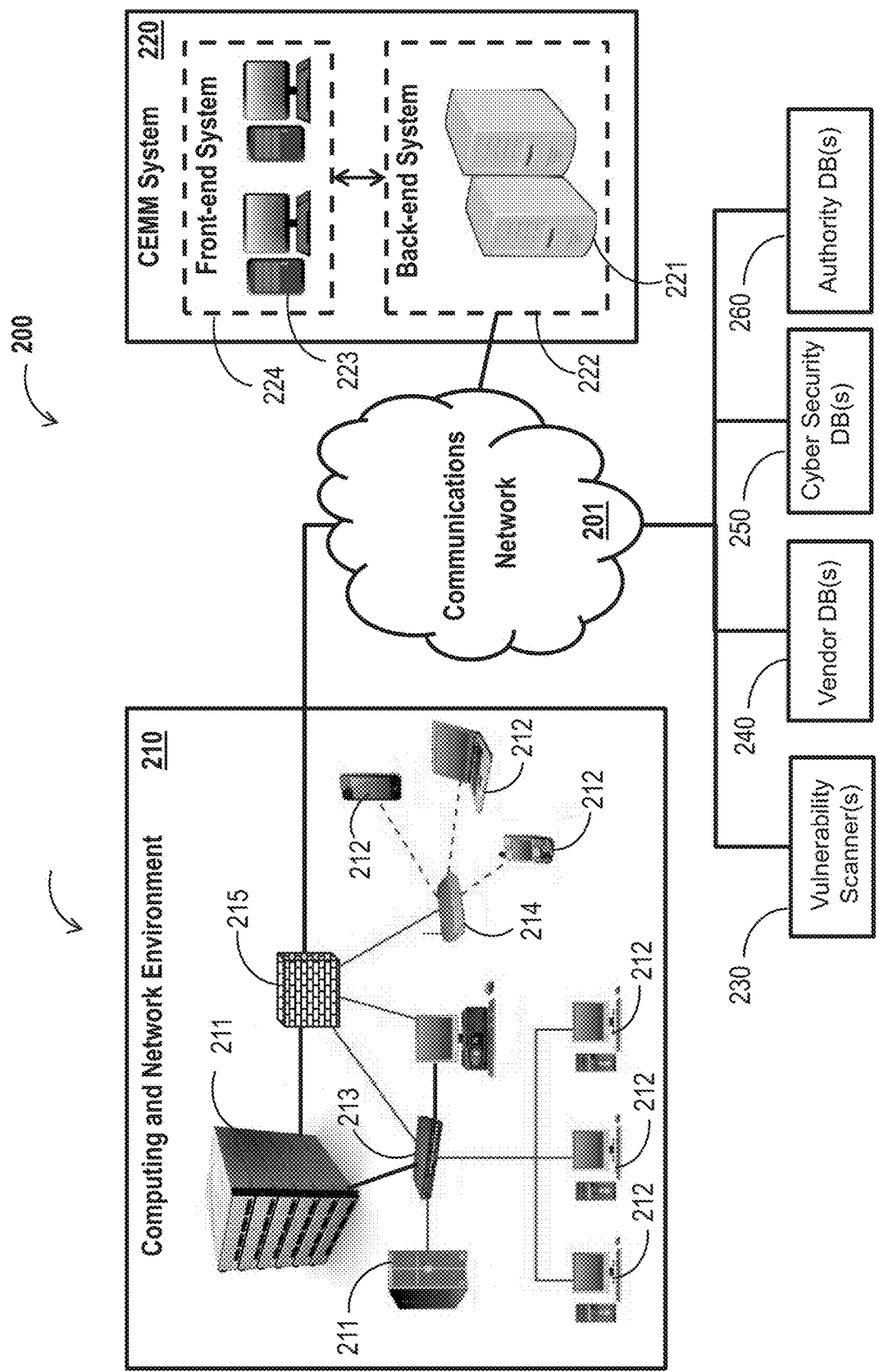
FIG. 2 is a block diagram illustrating an embodiment of an environment for monitoring and managing cyber security aspects of a computing and network environment.

Referring to FIG. 2, an embodiment of an environment 200 for monitoring and managing cyber security and robustness aspects of a computing and network environment 210 is depicted. The environment 200 can include a computing and network environment (or a computer network system) 210, a communications network 201, a computer environment monitoring and management (CEMM) system 220, one or more vulnerability scanners 230, one or more vendor databases 240, one or more cyber security databases 250, and one or more authority databases 260. The CEMM system 220 can be communicatively coupled to the computing and network environment 210, the one or more vulnerability scanners 230, the one or more vendor databases 240, the one or more cyber security databases 250, and/or the one or more authority databases 260 via the communications network 201. The communications network 201 can include a local-area network (LAN), e.g. Intranet, a metropolitan area network (MAN), a wide area network (WAN), a wireless network, a private network, a public network, the Internet, or a combination thereof.

The computing and network environment 210 can include a plurality of computer servers 211 and a plurality of client devices 212 that are communicatively coupled together, for example, via network devices such as one or more switches 213, one or more wireless modems 214, and/or other network devices. The computing and network environment 210 can include a firewall 215 for restricting external access to resources of the computing and network environment 210.

The computing and network environment 210 can include other electric or electronic devices or appliances such as one or more power generators, one or more air conditioning or cooling devices, one or more sensors, one or more gateways, one or more routers, one or more bridge devices, one or more hub devices, or a combination thereof. The computing and network environment 210 can be a corporate computer network, a communications network (such as a wireless communications network), a power grid, an automated manufacturing system, or the like. The computing and network environment 210 can include a plurality of software platforms or applications executing on the computer servers 211 and/or the client devices 212.

The CEMM system 220 can be configured to monitor and manage the cyber security posture and the health states of assets in the computing and network environment 210. An asset, as used herein, can include a device, system, software component, piece of data associated with computing and network environment 210. The CEMM system 220 can include a back-end system 222 and a front-end system 224. The back-end system 222 can include one or more computer servers 221 for executing back-end software modules to perform operations, such as collecting and analyzing data associated with the computing and network environment 210, assessing cyber security and operation (or health) states of one or more assets based on the analyzed data, executing management operations based on the assessment results, managing communications with the front-end system 224, or a combination thereof. For instance, the back-end system 222 can identify vulnerabilities associated with the computing and network environment 210 or respective assets, manage vulnerability patching, determine assets under stress, and/or detect asset misconfiguration or abnormal behavior based on data obtained from one or more sources. An asset under stress is an asset that is overloaded with respect to respective computational, communication, or storage resources, or other system resource. For example, a server 211 can be under computational stress when experiencing excessive CPU usage (e.g., beyond a given threshold value), or can be under communication stress when experiencing relatively high data communication rate(s) (e.g., exceeding a bit rate threshold value).

The front-end system 224 can include one or more client devices 223 for executing front-end software modules to communicate with and display data received from the back-end system 222. The front-end system 224 can be configured to display data received from the back-end system 222 (such as collected data, analysis data, assessment data, alerts, or a combination thereof). In some implementations, the client devices 223 can be associated with a control room having one or more display devices. In some implementations, the front-end system 224 and the respective client devices 223 can be part of the computing and network environment 210. The front-end system 224 can include one or more client applications, which when executed on a client device 223, cause the client device 223 to communicate with the back-end-end system 222 (or a computer server 221 thereof) to acquire and display data.

The back-end system 222 can be communicatively coupled to one or more vulnerability scanners 230. The vulnerability scanner(s) 230 can include, for example, a vulnerability scanner by Qualys®, Rapid7, Elastica, Nessus®, Veracode, or any other vulnerability scanner provider. The vulnerability scanner(s) 230 can include one or more information technology (IT) asset management software tools, such as that provided by Hewlett Packard, International Business Machines (IBM), Microsoft (MSFT), or any other providers. A vulnerability scanner 230 can include a computer scanning program for assessing security weaknesses of computer devices, computer software, computer systems or networks. For instance, the computer scanning program can be configured to identify software components within the computing and network environment 210 that are vulnerable to malicious attacks. Each vulnerability scanner 230 can be executed on one or more computer devices associated with a provider of that vulnerability scanner 230 or one or more computer devices of the computing and network environment 210. The back-end system 222 can send a scanning request to the vulnerability scanner 230 and, in response, receive scanning results associated with one or more assets of the computing and network environment 210. The scanning request can be a full scanning request (e.g., for scanning all assets of the computing and network environment 210) or a partial scanning request (e.g., for scanning a subset of the assets of the computing and network environment 210).

The back-end system 222 can obtain data relevant to the security posture of the computing and network environment 210 from the vendor database(s) 240, cyber security database(s) 250, authority database(s) 260, and/or other sources. The vendor database(s) 240 can include databases, websites, blogs, or social media pages associated with software and/or hardware vendors. The vendor database(s) 240 can include published data regarding problems or weaknesses (such as vulnerabilities) associated with hardware or software components and/or corresponding fixes (e.g., vulnerability patches), updates or new versions of software components, or a combination thereof. The vendor database(s) 240 can include a database sponsored or provided, for example, by MSFT, IBM, Oracle, Google, or other hardware or software vendors. Cyber security database(s) 250 can include databases, websites, blogs and/or social media pages related to cyber security such as the Common Vulnerabilities and Exposures (CVE) database or other databases by Qualys®, MSFT, IBM, or Google. The authority database(s) 260 can include databases and/or websites related to cyber security and associated with government institutions or organizations such as the Federal Bureau of Investigation (FBI), the Department of Homeland Security (DHS), European Network and Information Security Agency (ENISA), North Atlantic Treaty Organization (NATO), or the like. The databases 250 and 260 can include published information regarding, for example, viruses, vulnerabilities, hacking trends or techniques, known hackers or malicious sources, available cyber security protection solutions, or a combination thereof.

Figure 3:
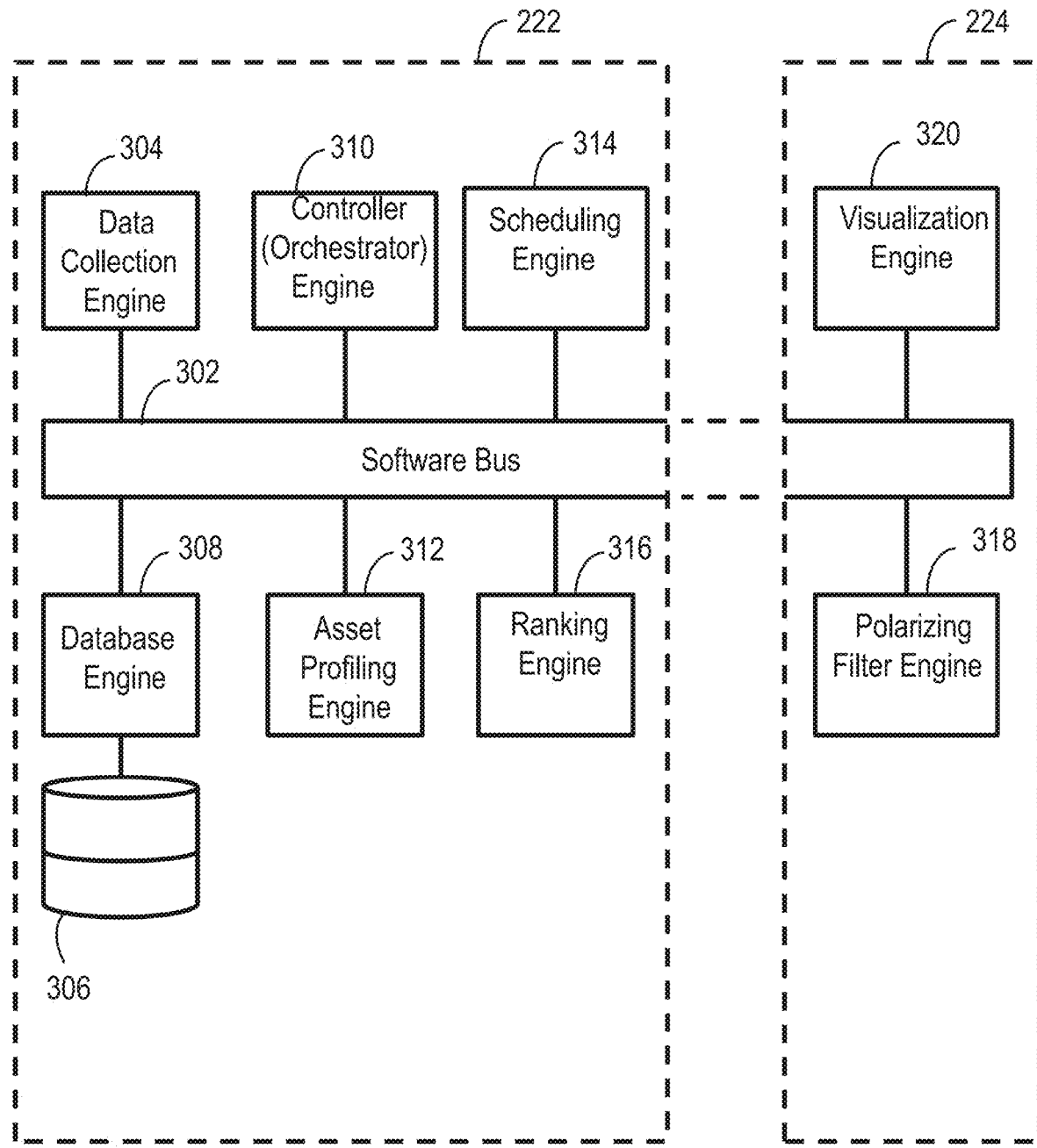
FIG. 3 shows an embodiment of an architecture of a computer environment monitoring and management (CEMM) system.

FIG. 3 shows an embodiment of an architecture of the CEMM system 220. The CEMM system 220 can include a software bus (also referred to as a virtual bus) 302, a data collection engine 304, a database 306, a database engine 308, a controller (or orchestrator) engine 310, an asset profiling engine 312, a scheduling engine (also referred to as scheduler) 314, a ranking engine 316, a polarizing filter engine 318, and a visualization engine 320. The data collection engine 304, the database 306, the database engine 308, the controller engine 310, the asset profiling engine 312, the scheduling engine 314, and the ranking engine 316 are modules of the back-end system 222, whereas the polarizing filter engine 320 and the visualization engine 322 are modules of the front-end system 224.

Referring to FIGS. 2 and 3, the data collection engine 304 can be configured to manage collection of data from various data sources such as the vulnerability scanner(s) 230, the vendor database(s) 240, the cyber security database(s) 250, the authority database(s) 260, or a combination thereof. The data collection engine can use, for example, one or more application program interfaces (APIs) or secure communication channels to obtain data from the data sources. For instance, the data collection engine 304 can use APIs to request the vulnerability scanner(s) 230 to scan the computing and network environment 210 or assets thereof. The data collection engine 304 can receive vulnerability scanning results over secure communication channels between the CEMM system 220 and the vulnerability scanner(s) 230. The data collection engine 304 can also access external databases, such as databases 240, 250 and/or 260, to obtain cyber security information relevant to one or more assets of the computing and network environment 210, for example, over secure communication channels. The data collection engine 304 can employ search functions or search queries to fetch relevant cyber security data in the databases 240, 250 and/or 260. The data collection engine 304 can employ various types of search queries based on the information of interest sought. For example, the data collection engine 304 can be configured to generate (or use) separate search queries to look for cyber security threat outbreaks, determine potential cyber security risk exposures (e.g., malware) of the CEMM system 220, for example, based on implemented software and/or hardware, and/or search for configuration issues (e.g., secure sockets layer (SSL) issues) based on software or hardware configurations associated with the CEMM system 220. The data collection engine 304 can initiate data collection processes (e.g., vulnerability scans or sending search queries to external databases) periodically or in response to a request from another module of the CEMM system 220.

The data collection engine 304 can be configured to identify and map similar data parameters or similar data sets received from distinct data sources. For instance, various data sources can associate distinct identifiers and descriptions to a single vulnerability or malware. Also, separate data sources can employ different severity levels to rate the severity of a given cyber security threat. The data collection engine 304 can map data items (or data files) indicative of a common cyber security subject matter or issue that are received from separate data sources to one another based on respective identifiers. In some implementations, the data collection engine 304 can be configured to merge such data items into a single data item or description for storing by the CEMM system 220. By mapping and merging of cyber security data items associated with a common cyber security subject matter or issue, the data collection engine 304 can eliminate or reduce data redundancy resulting in efficient data storage and improved access speed of stored data.

Figure 4A:
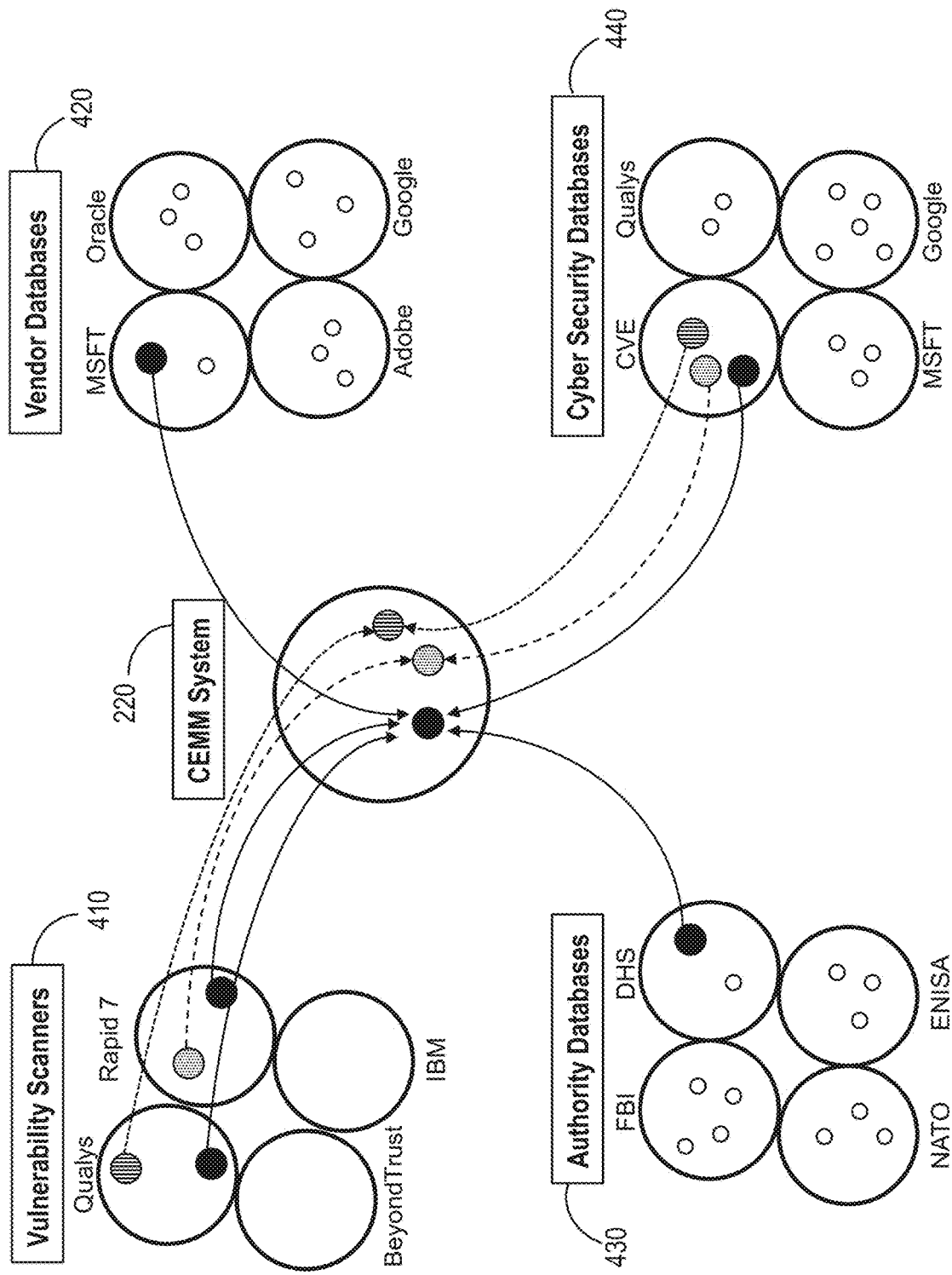

FIGS. 4A and 4B show a diagram and a table 450, respectively, illustrating an embodiment of mapping similar data items from various data sources to one another. The data collection engine 304 can receive scanning data from a plurality of vulnerability scanners 410, such as vulnerability scanners by Qualys®, Rapid7, BeyondTrust, and IBM. The data collection engine 304 can fetch vendor databases 420 (e.g., databases associated with Microsoft (MSFT), Oracle, Adobe, and Google), authority databases 430 (e.g., databases associated with the FBI, DHS, NATO, or ENISA), and cyber security databases 440 (e.g., the CVE database or databases associated with Qualys®, MSFT, and Google).

The data collection engine 304 can store and maintain table 450 (or other data structure) for matching, or mapping to one another, identifiers assigned by various data sources to a given cyber security subject matter or issue. A cyber security subject matter or issue as used herein can include a software or hardware configuration issue, a vulnerability, a vulnerability patch, a malware, a cyber security weakness associated with a software or hardware component, or the like. The data collection engine 304 can assign its own identifiers to published cyber security matters and store the assigned identifiers, for example, in a column of the table 450. The data collection engine 304 can allocate for each data source (e.g., the vulnerability scanners 230 and/or the databases 240, 250 or 260) a respective column of the table 450 to store identifiers assigned by that data source to various cyber security subject matters. For example, the left most column of table 450 can include identifiers assigned by the data collection engine 304, the second left most column can include identifiers assigned by Qualys®, and the right most column can include identifiers associated with DHS. A data source may not have assigned identifiers to one or more cyber security subject matters. For each cyber security subject matter, the data collection engine 304 can allocate a respective row of the table 450 to store identifiers assigned by various data sources to that cyber security subject matter. In some implementations, the data collection engine 304 can use one or more other data structures (e.g., other than the table 450) to store information (e.g., descriptions, publication dates, severity levels, published solutions, or the like) related to the cyber security subject matters. The information associated with each cyber security subject matter can be mapped to the respective identifier associated with the CEMM system 220 (or assigned by the data collection engine 304).

The data collection engine 304 can receive, from various data sources, data (e.g., vulnerability scanning results and/or search results or alerts from databases 240, 250 or 260) indicative of cyber security subject matters or issues related to the computing and network environment 210. The data received from a given data source can include, for each cyber security subject matter indicated in the data, a respective identifier assigned by that data source. Upon receiving cyber security data from a given data source, the data collection engine 304 can scan that data to extract or determine one or more identifiers of cyber security subject matters indicated therein. The data collection engine 304 can compare each extracted identifier to identifiers associated with the CEMM system 220 in table 450 (e.g., identifiers in the left most column of table 450). If a match is found, the data collection engine 304 can employ the corresponding matching identifier associated with the CEMM system 220 instead of the extracted identifier to identify the respective cyber security subject matter. If no match is found, the data collection engine 304 can assign a new identifier to the respective cyber security subject matter, and store the new identifier in table 450 (e.g., at the left most column and a new row). The data collection engine 304 can also store other information related to the respective cyber security subject matter (e.g., description, potential affected software or hardware modules, links, publication data, publication source(s), published solution(s), severity level, etc.) associated with the new assigned identifier in one or more other data structures (e.g., other than table 250). The data collection engine 304 can map such information to the new assigned identifier.

The data collection engine 304 can merge multiple descriptions (associated with various data sources) of each cyber security subject matter into a single description, and store that single description instead of storing the multiple ones provided by the various data sources. Accordingly, the data collection engine 304 can reduce the amount of data stored and maintained by the CEMM system 220. Furthermore, by reducing the amount of data stored, the speed of accessing and processing such data by the data collection engine 304 or other modules of the CEMM system 220 can be enhanced. However, the data collection engine 304 can maintain some of the information associated with a given cyber security subject matter in redundant form. For example, the data collection engine 304 can maintain various severity levels (e.g., associated with various data sources) for a given vulnerability or cyber security threat.

Referring to FIGS. 2 and 3, the data collection engine 304 (or the CEMM system 220) can be configured to receive, as input, design specification data associated with the computing and network environment 210. The design specification data can include data associated with design blueprints or design documents, contractual agreements, engineering standards, compliance regulations or guidelines, and/or other design or specification information associated with the computing and network environment 210 or respective assets. Such data can include, for example, information indicative of network layouts, asset architectural or configuration variables, asset functional or operational requirements, asset ownership information, security requirements, legal requirements, compliance requirements, business requirements, or a combination thereof. The design specification data can be viewed as data representing how the computing and network environment 210 is intended to be built and to operate. The data collection engine 304 can receive the design specification data as user input via one or more input interfaces of one or more computing devices of the CEMM system 220 or from a computing device or database associated with the computing and network environment 210.

In some implementations, the data collection engine 304 (or another module of the CEMM system 220) can arrange the received design and architecture data into a plurality of specification profiles. The data collection engine 304 can generate, or receive, a plurality of specification profiles for each of a plurality of assets of the computing and network environment 210 based on received design specification data. The specification profiles associated with an asset of the computing and network environment 210 can include a respective plurality of configuration or design variables that specify, for example, an asset type or classification, interconnections, asset owner(s), location information, functional or operational information, redundancy requirements, compliance requirements, legal requirements, business requirements and/or other aspects of that asset. The specification profiles can be viewed as representing the "DNA" of the computing and network environment 210 and/or respective assets. In particular, the CEMM system 220 can use values of the variables in the specification profiles as reference values to assess how well the computing and network environment 210 is operative in accordance with its intended design. The CEMM system 220 can identify one or more variables of the computing and network environment 210 to be monitored based on the received design and architecture data.

Figure 5:
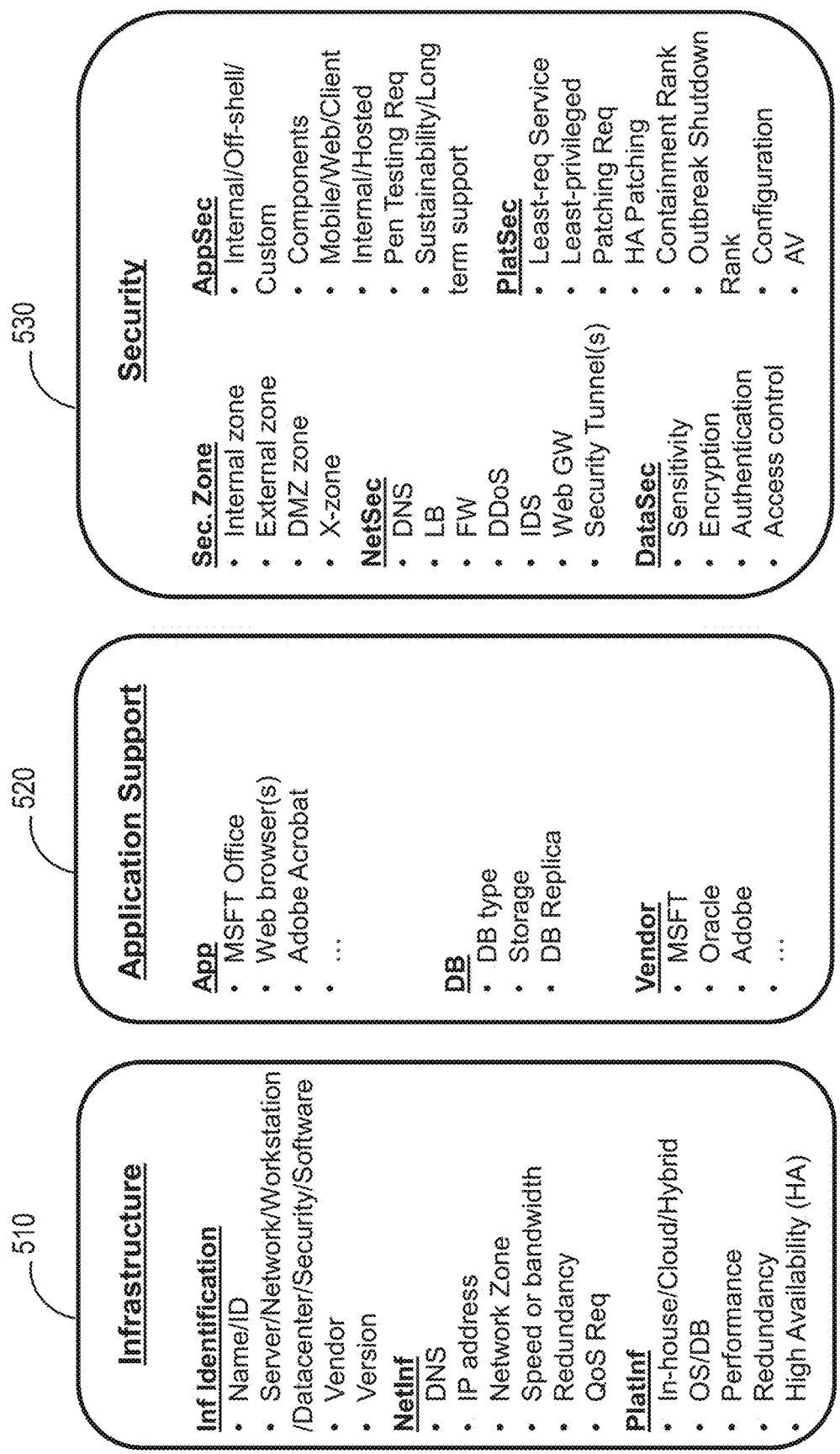
FIG. 5 shows examples of specification profiles associated with an asset of a computing and network environment.

Referring to FIG. 5, examples of specification profiles for an asset of the computing and network environment 210 are illustrated. The illustrated specification profiles include an infrastructure profile 510, an application support profile 520 and a security profile 530. The specification profiles shown in FIG. 5 are not to be interpreted as limiting or exhaustive. In particular, the CEMM system 220 can define any number of specification profiles in association with the computing and network environment 210 or in association with any respective asset. Furthermore, the variables defined in each specification profile can vary based on the implementation of the CEMM system 220, the computing and network environment 210 monitored, the asset associated with that specification profile, or a combination thereof.

The infrastructure profile 510 can include one or more sections such as "infrastructure identification," "network infrastructure" and "platform infrastructure." The "infrastructure identification" section can include variables identifying the respective asset such as a name or identifier (ID), a category, a vendor, and a version of the respective asset. The category of the asset can be indicative, for example, of whether the asset is a software asset, a server, a workstation, a network appliance, a datacenter, or a security asset (e.g., a firewall). In some implementations, the "infrastructure identification" section can include variables indicative of memory capacity, central processing unit (CPU) information, a date the asset was launched or installed within the computing and network environment 210, one or more links associated with the asset or the respective vendor, or a combination thereof. The "network infrastructure" section can include, for example, variables such as a domain name system (DNS), an Internet protocol (IP) address, a network (or security) zone, a speed and/or bandwidth, a redundancy variable, and one or more quality of service (QoS) requirements associated with the respective asset. The QoS requirements can be indicative of acceptable values with respect to, for example, error rate, bit rate, throughput, transmission delay, availability, packet delay variation, or a combination thereof. The speed or bandwidth can be indicative of one or more maximum data rates supported by the respective asset. The "network infrastructure" section can include other variables such as a number of input or output ports, data packet processing capabilities, supported transport protocols or a combination thereof. The "platform infrastructure" section can include variables indicative of platform information associated with the respective asset, such as a platform category (e.g., in-house, cloud or hybrid), supported operating system or database, performance parameter(s), redundancy parameter(s) and high availability parameter(s). In some implementations, the sections and or variables associated with the infrastructure profile 510 can vary from one asset to another, for example, based on the asset category.

The application support profile 520 can include variables or information indicative of software applications (or software modules) or databases associated with a respective asset. For instance, the application support profile 520 can include a list of software applications supported by or installed in a the respective asset. The list of software applications can include information such as the name, version, and/or release date of each software application. The application support profile 520 can also include a list of databases maintained or accessible by the respective asset. The list of databases can include indications of the database management system (DBMS), storage, and/or replica(s) associated with each database in the list. The application support profile 520 can include a list of vendors of the software applications or databases associated with the asset including the name and/or one or more links associated with each vendor.

The security profile 530 can include information and variables related to the cyber security of the respective asset. For instance, the security profile 530 can include variables indicative of a security zone of the asset, network security variables, platform security variables, application security variables and data security variables. The network security variables can include, for example, parameters or information indicative of a DNS, a load balancer (LB), a firewall (FW), defensive techniques against denial-of-service (DoS) or distributed denial-of-service (DDoS) attacks, and/or an intrusion detection system (IDS) associated with the asset. The network security variables can also include indications of web gateways coupled to the asset and/or security tunnels supported by the asset. For a given software application, the respective application security variables can include parameters or information indicative of a respective type and/or category and/or respective components. The security variables can include parameters related to penetration testing requirements and/or sustainability solutions for one or more software applications supported by the respective asset. The data security variables can include parameters indicative of data sensitivity level(s), encryption techniques and/or authentication or access control measures associated with the respective asset. The platform security variables can include, for example configuration parameters, patching requirements, indication of antivirus software, indication of least-privileged access level(s), priority of containment in case of attack and/or priority of shutdown in case of an attack outbreak associated with the respective asset.

The specifications platforms 510, 520 and 530 are neither limiting nor exhaustive. For instance, the CEMM system 220 can generate or employ, for a given asset of the computing and network environment 210, other specification profiles such as "Function," "Redundancy," "Compliance," "Risk," "Service Level Agreement (SLA)," "Legal," "Geolocation," "Power" or a combination thereof. The "Function" profile can be indicative of a business function associated with the asset and can include variables representative of research, development, production, staging, and/or marketing." The "Redundancy" profile can include variables indicative of a redundancy or one or more redundancy requirements of the asset within the computing and network environment 210. For instance, the "Redundancy" profile can include variables indicative of asset availability categories, such as high availability, disaster recovery, or business continuity. Each availability category can be associated with a respective redundancy level. The "Compliance" profile can include variables indicative of compliance requirements associated with the asset. The compliance requirements can be defined based on compliance regulations or guidelines. The "Risk" profile can include variables indicative of, for example, risks associated with non-protected data, loss of data, unauthorized access and/or down time for a respective asset. The "SLA" profile can include variables indicative of requirements such as remote accessibility, accessibility from mobile devices, continuous availability (e.g., 24 hours a day, 7 days a week) of service associated with the asset (e.g., email or web service). The "Legal" profile can include variables indicative of local regulations, legal requirements, or contractual agreement, such as the incorporation of a given disclaimer in emails sent externally, system redundancy, or continuous and full data backup. The "Geolocation" profile of an asset can include variables indicative of the asset name, the geolocation of the asset, the physical location of a data center associated with that asset, the physical location of a server rack associated with that asset, the position of the asset within a respective server rack, or a combination thereof. The "Power" profile can include variables or information related to, for example, which power grid does the respective asset sit on, which power center does it feed from, which power supply in the data center (or business location) is it connected to, whether there is a diesel power generator that feeds into its grid, whether such power generator is redundant, what power unit is installed on the rack the asset sits in, whether such power unit is redundant, and/or a combination thereof. The "Power" profile can include variables indicative of operational voltage requirement(s), operational current requirement(s), electric fault tolerance or a combination thereof.

Referring back to FIG. 3, the data collection engine 304 can store the specification profiles for a given asset in the database 306 as data vectors, data matrices, or other data structures. The data collection engine 304 (or other module of the CEMM system 220) can also use the specification profiles to determine a number of variables associated with the asset to be monitored. Specifically, the specification profiles for the asset can be viewed as representing the per-design or architectural "DNA" or design/architectural benchmarks for that asset. The CEMM system 220 can monitor a plurality of design parameters for a given asset and compare the monitored parameters to corresponding variables in the specification profiles associated with asset to determine whether the asset is operative in accordance with the intended design or architecture described in the specification profiles. In particular, the CEMM system 220 can monitor deviations of asset parameters from the corresponding variables in the specification profiles. Also, since the specification profiles for a given asset can be comprehensive (e.g., include a multitude of design aspects of that asset), monitoring design or architectural parameters corresponding to the variables in the specification profiles provides valuable multi-dimensional data, including information indicative of asset dependencies on other assets, in detecting, protecting against or reacting to cyber security threats or attacks. Such monitoring can provide multi-dimensional views of assets in the computing and network environment 210 over time.

The database 306 can be configured to store data collected by the data collection engine 304 or other modules (e.g., the asset profiling engine 312) of the CEMM system 220. For instance, the database 306 can store the specification profiles of assets in the computing and network environment 210, data received from vulnerability scanners 230, vendor databases 240, cyber security databases 250 or authority databases 260, asset profiling data obtained by the asset profiling engine 312, or a combination thereof. The database engine 308 can be configured to handle access to the database 306. For instance, the database engine 308 can handle read or write requests from other engines or modules of the CEMM system 220. The back-end system 22 can analyze data collected from various data sources to determine which, or how, historical data is stored in the database 306. For example, for some asset parameters (e.g., CPU usage, throughput, or bit rate) the back-end system can compute average values (or other statistical parameters) over a time period and store the computed statistical parameters in the database 306 instead of storing the collected values. The database engine 308 can include a compression module (not shown in FIG. 3) for compressing data before storing in the database 306. Given that the amount of data collected by the CEMM system 220 over time can be increasingly large, storing data in compressed form allows for efficient use of memory associated with the database 306. In some implementations, the database engine 308 can also include a decompression module (not shown in FIG. 3) for decompressing (if desired) data retrieved from the database 306.

The controller engine 310 can be viewed as the "brain" of the CEMM system 220. The controller engine 310 can orchestrate data collection by the data collection engine 304 or the asset profiling engine 312, process collected data, handle interactions with the front-end system 224, and/or determine processes to be executed by one or more other engines, for example, responsive to analysis of received data. For instance, the controller engine 310 can be configured to set the frequency for scanning the computing and network environment 210 for vulnerabilities, instruct the data collection engine 304 or the asset profiling engine 312 to collect data associated with one or more assets, and/or specify data associated with one or more assets to be collected. Also, the controller engine 310 can receive requests for data from the front-end system 224, and in response prepare and provide the requested data to the front-end system 224 for display. Processes and decisions associated with the controller engine 310 are described in further detail throughout this disclosure.

The asset profiling engine 312 can query (or interrogate) assets of the computing and network environment 210 for data related to those assets. As such, the asset profiling engine 312 can be viewed as a tool for obtaining real-time profiling data of an asset of interest directly from that asset or other assets (e.g., other assets that can communicate with, or having information about, the asset of interest). The asset profiling engine 312 can receive the asset profiling data via a communication channel established with the asset of interest or other assets. The profiling data can include any data that can be requested from the asset of interest or other assets, such as asset identification info, asset IP address, asset media access control (MAC) address, asset network basic input/output system (NetBIOS), asset operating system (OS), configuration data, asset resources' usage information (e.g., CPU usage, memory usage, battery usage, logs, communication load over one or more ports, etc.), installed applications, asset interconnection or communication information (e.g., devices communicating with connected to the asset, asset user(s), or a combination thereof.

The asset profiling engine 312 can profile a given asset of the computing and network environment 210 according to a pre-defined profiling frequency or responsive to instructions from the controller engine 310 or other module of the CEMM system 220. The asset profiling engine 312 can support a plurality of profiling types (or profiling modes) defined, for example, based on the profiling data to be requested, a profiling depth, the purpose of the profiling, the asset or component thereof to be profiled, the profile triggering event (e.g., routine profiling or event triggered profiling), or a combination thereof. For example, when profiling a security camera, the asset profiling engine 312 may be mainly interested in whether the camera is on and recording. However, in profiling a firewall or an asset thereof, the asset profiling engine may want to know the IP addresses of devices that attempted to access resources of the computing and network environment 210 in a given period of time, the IP addresses blocked, the IP addresses that successfully accessed the resources, or a combination thereof. Also, the asset profiling engine 312 may profile an asset, for example, for respective CPU usage, memory usage, or communication load according to a hierarchical profiling model with increasing depth (or level of detail) of the profiling data. Each depth can be associated with a respective profiling mode or sub-mode.

In some implementations, each profiling mode can be associated with one or more respective profiling templates defining the profiling data to be requested. For instance, each profiling template can include a query for one or more respective asset parameters. In profiling a given asset, the asset profiling engine 312 can select a profiling template from a plurality of templates for sending to the asset to be profiled or other related asset. Employing a plurality of profiling modes, or profiling templates, allows the asset profiling engine 312 to collect profiling data efficiently and relatively fast by requesting only the desired information at the time of profiling. The asset profiling engine 312 can avoid overloading assets of the computing and network environment 210 with unnecessary computational and communication burden to fetch, retrieve and transmit relatively large chunks of data. In general, the use of a plurality of asset profiling modes (or asset profiling templates) results in a smart profiling approach characterized by profiling flexibility, speed and efficiency.

One asset profiling mode is referred to herein as "light asset profiling" or "light profiling." The asset profiling engine 312 can be configured to perform light profiling to each of a plurality of, or all, assets of the computing and network environment 210. In light profiling mode, the asset profiling engine 312 can query a given asset for a relatively limited and/or high level set of parameters mainly to confirm that the asset exists and is genuine. For example, the asset profiling engine 312 can query the asset for its IP address, MAC address, firmware information, serial number, hardware information, device unique identifier(s), or a combination thereof when performing light profiling. The parameters requested in light profiling mode can vary, for example, based on the profiled asset. Upon receiving a response from the asset, the asset profiling engine 312 can determine that the asset exists. Also, the asset profiling engine 312 can compare parameter values received from the asset to corresponding asset variables maintained by the CEMM system 220 (e.g., specification profile variables or parameters received from other assets or external data sources such as the vulnerability scanner(s) 230 or any of the databases 240, 250 and 26). Accordingly, the asset profiling engine 312 can confirm the existence of and authenticate any asset with communications capabilities described in the specification profiles or reported by any other entity. The asset profiling engine 312 can perform light profiling for one or more assets of the computing and network environment 210 periodically according to one or more respective light profiling frequencies, or responsive to a given event (e.g., receipt of vulnerability data, discrepancy in collected data, detection of an abnormal behavior). Light profiling can be performed relatively fast (e.g., compared to some other profiling modes) given the nature and relatively small number of parameters associated with each light profiling event.

Figure 6:
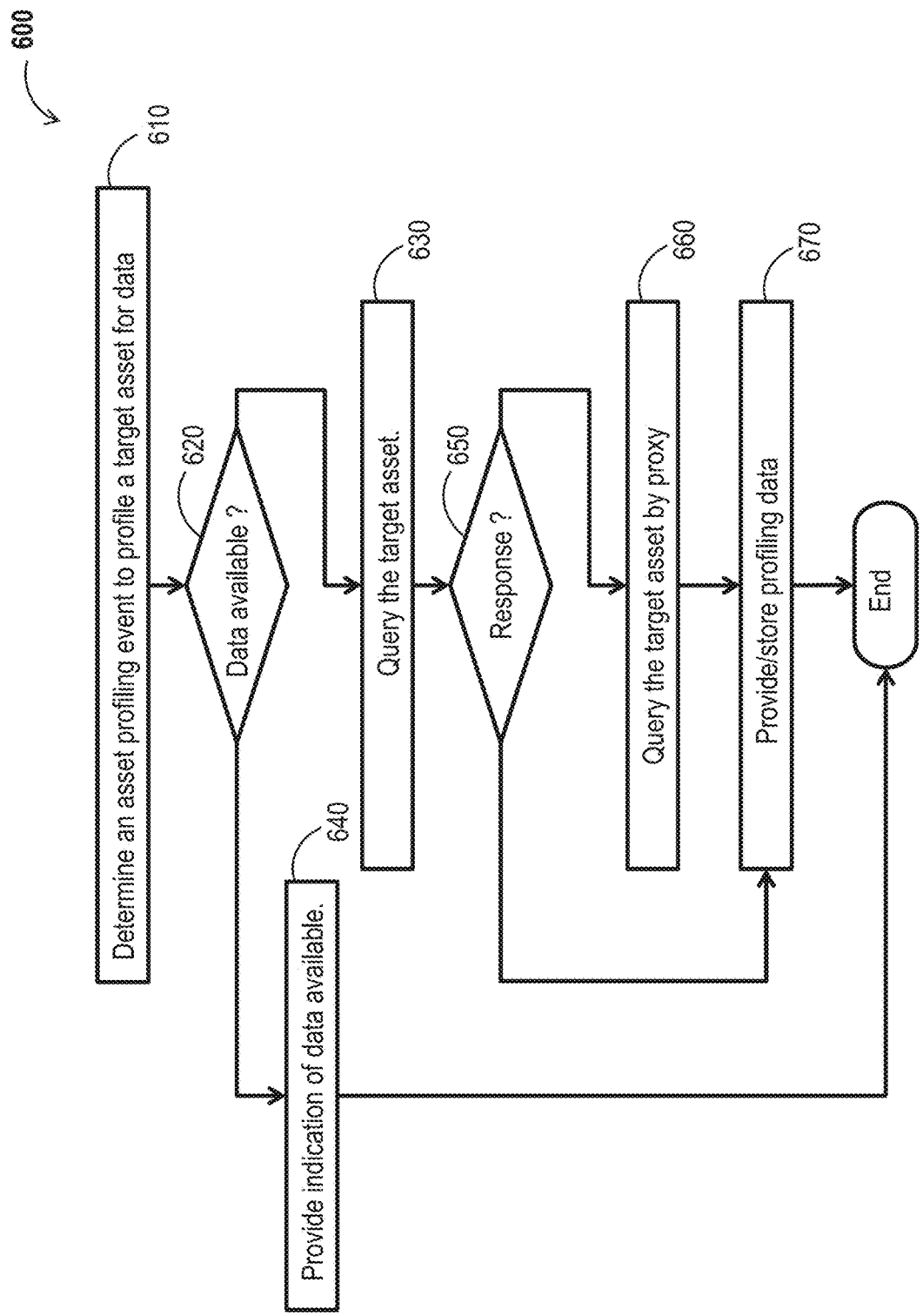
FIG. 6 shows a flowchart illustrating an asset profiling method.

FIG. 6 shows a flowchart illustrating an asset profiling method 600. The method 600 can include determining an asset profiling event to profile a given asset for data (step 610), checking for availability of requested data (decision block 620), and querying the asset if the requested data is not available (step 630) or otherwise providing an indication of the data available (step 640). Upon receiving a response from the queried asset (decision block 650), the asset profiling engine 312 (or other entity) can store or provide the profiling data received to another entity (step 670). Otherwise, the asset profiling engine 312 can query another asset (step 660) and store or provide received profiling data to another entity (step 670).

The method 600 can include the asset profiling engine 312 (or the scheduling engine 314) determining or detecting an asset profiling event to profile a target asset for data (step 610). The asset profiling engine 312 can receive a request from the controller engine 310 or another entity of the CEMM system 220 to profile a given asset. For instance, upon detecting a discrepancy in the specification profiles and/or data received from the vulnerability scanner(s) 230, the controller engine 310 can instruct the asset profiling engine 312 to profile one or more assets to resolve such discrepancy. The request can include an indication of profiling or mode to be used or profiling data to be requested from the asset. In the case of periodic profiling, the asset profiling engine 312 can initiate profiling the asset based on timing information.

The asset profiling engine 312 or the controller engine 310 can check whether the requested profiling data is already available to CEMM system 220 (decision block 620). The CEMM system 220 can use available data (e.g., stored in a memory or cache) recently received (e.g., in the last 10 mins or 30 mins) from one or more other assets to deduce the requested profiling information without necessarily having to query the asset of interest directly. The indirect deduction of such information can help reduce profiling communication with assets of the computing and network environment 210, and can allow obtaining the requested information (or even a reduced version of it) when the asset of interest is under stress (e.g., computational or communication overload) or lost connection with the CEMM system 220. The asset profiling engine 312 or the controller engine 310 can check if any other assets communicated with the target asset, for example, in a recent period of time (e.g., in the last hour or last 30 minutes), and what time did such communication(s) occur. As an example, a server 211 can report to the CEMM system 220 respective access to a database server of the computing and network environment 210 to retrieve data. Such information can be sufficient for the asset profiling engine 312 or the controller engine 310 to deduce that the database server is live and answering requests. As such, the asset profiling engine 312 can skip asking the target asset if it is live. In some implementations, the asset profiling engine 312 can store information indicative, for example, of the reliability of the deduced information. For example, information deduced based on data reported by multiple assets can be more reliable than information deduced based on data reported by a single asset. Also, information deduced based a sequence of inferences (e.g., each based on data reported by a respective asset) can be less reliable than information deduced based on a single inference.

If the requested data is already available to the CEMM system 220 (decision block 620), the asset profiling engine 312 can send an indication of such data to the controller engine 310 (step 640). In some implementations, step 640 can be optional. However, if the data is not available to the CEMM system 220 (decision block 620), the asset profiling engine 312 can start querying the target asset (step 630). The asset profiling engine 312 can select a profiling mode (e.g., select a profiling template) based on, for example, the profiling event determined at step 610, the target asset, the profiling data requested, or a combination thereof. The asset profiling engine 312 can send a query to the target asset based on, for example, the selected profiling mode or selected profiling template.

If a response is received from the target asset (decision block 650), the asset profiling engine 312 can store the data received in the response in a memory (or memory cache), or provide the received data to the controller engine 310 or some other entity of the CEMM system 220 (step 670). For instance, if the controller engine 310 instructed the asset profiling engine 310 to profile the target asset at step 610, the asset profiling engine 312 can respond at step 670 by providing the data received from the target asset (or a version thereof) to the controller engine 310. However, if no response is received from the target asset (decision block 650), the asset profiling engine 312 can perform proxy profiling (step 660).

In proxy profiling, the asset profiling engine 312 can ask other assets of the computing and network environment 210 to profile the target asset. For instance, in the case where the target asset is no longer reachable by the CEMM system 220, the asset profiling engine 312 can send a request to one or more other assets of the computing and network environment 210 to profile the target asset on its behalf. In some implementations, the asset profiling engine 312 can send such a request to one or more designated computer devices of the computing and network environment 210 (e.g., a workstation or server associated with an information technology (IT) operator). The request can include an indication of parameters to be requested from the target asset. The one or more other assets can send one or more queries to the target asset based on the request received from the asset profiling engine 312.

Upon receiving a response from the target asset, the one or more other assets can forward the received response (or information therein) to the asset profiling engine 312. In some implementations, the profiling data obtained by the one or more other assets can represent only a subset of the profiling data originally requested by the asset profiling engine 312. In some instances, the one or more other assets may not have the privilege (or are unsuccessful) to perform the profiling of the target asset. In such instances, the one or more other assets can respond to the asset profiling engine 312 to indicate their failure and/or the reason of profiling failure. The one or more other assets can include any information the already have about the target asset in their response(s).

In the case of periodic profiling, the respective profiling frequency can depend based on the profiled asset. For example, the profiling frequency can be relatively high for a high value (or high ranked) asset whereas the profiling frequency for a low value (or low ranked) asset can be relatively low. The profiling frequency can be specific to each asset and can be continuously adjusted, for example, based on the state of the respective asset. For example, if an asset is experiencing stress or abnormal behavior, the controller engine 310 can increase the profiling frequency of the asset to allow collecting profiling data every one or more milliseconds. The controller engine 310 can also decrease the profiling frequency of an asset where information about that asset can be obtained or deduced from already available data.

When profiling a given asset, the asset profiling engine 312 can query that asset for a variety of information that can include, but limited to, resource usage details (CPU, memory, disk, etc.), installed software, registry key entries (e.g., settings of the OS or software applications), other assets the given asset is communicating with, connections open, communication logs, the like, or a combination thereof. The profiling depth (e.g., the level of detail of profiled data) may vary from one profiling event to another. For instance, in a light profiling event, the asset profiling engine 312 can ping the asset to request high level information indicative of the identity and the connectivity (e.g., whether the asset is connected and responding) of the asset. However, when attempting to investigate an abnormal behavior (e.g., stress, generating unusual traffic, attempts to access blocked websites, violation of one or more requirements, etc.) or whether the asset is affected by a vulnerability or cyber security threat, the asset profiling engine 312 can query the asset for more detailed information such as CPU usage per process, network resources' usage per application, communication logs, or the like. The acquisition of such information can involve transmission of large chunks of data by the profiled asset to the asset profiling engine 312. The communication of large amounts of data as part of asset profiling processes can put a high computational and communication burden on assets of the computing and network environment system 210 as well as on the CEMM system 220, especially if asset profiling is performed regularly or frequently.

The asset profiling engine 312 can be configured to perform hierarchical profiling to efficiently acquire detailed asset profiling information in a way not to overload the profiled asset(s). A hierarchical profiling scheme can include multiple sequential profiling steps, each associated with a respective profiling query. As the asset profiling engine 312 moves from one profiling step to the next, more detailed and more specific data is requested from the profiled asset (e.g., profiling depth increases). Information to be queried at a given step can be determined based on previously acquired data. In such case, only relevant data is requested at each step of the hierarchical profiling process. For example, if the asset profiling engine 312 determines at one profiling step that the cumulative CPU usage for a given asset is unusually high, it may decide to query for the CPU usage per processor core. The hierarchical profiling scheme is discussed in more detail with regard to FIGS. 9 and 10 below.

Referring back to FIG. 3, the back-end system 222 can include a scheduling engine 314 configured to manage communications with external devices and establish communication channels with such external devices. For instance, the scheduling engine 314 can be configured to establish communication channels (or communication links) with computer devices of the computing and network environment 210 (e.g., for asset profiling purposes), computer devices associated with the vulnerability scanner(s) 230 (e.g., to request and acquire vulnerability scanning data), or the databases 240, 250 or 260. The scheduling engine 314 can employ one or more exchange protocols such as Hypertext Transfer Protocol (HTTP), Simple Mail Transfer Protocol (SMTP), Secure Shell (SSH) protocol, Simple Network Management Protocol (SNMP), Windows Management Instrumentation (WMI), File Transfer Protocol (FTP), the like, or a combination thereof. Such protocols can be implemented as plugins allowing the possibility to add other protocols.

Figure 7:
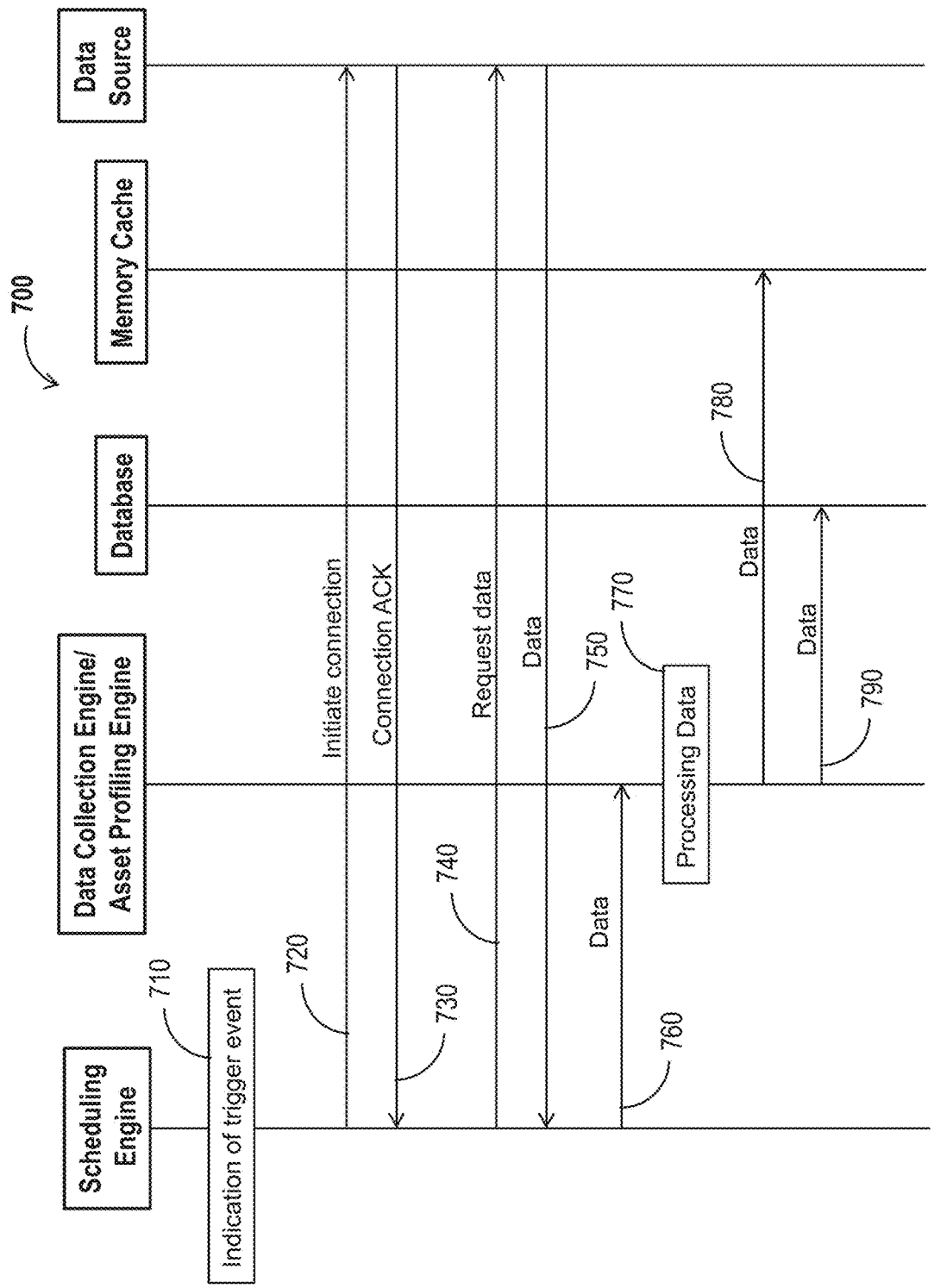
FIG. 7 shows a signaling diagram illustrating a method of establishing a communication link (or channel) with a data source and acquiring data via that communication link.

FIG. 7 shows a signaling diagram illustrating a method 700 of establishing a communication link (or channel) with a data source and acquiring data via that communication link. The method 700 can include receiving or detecting an indication of a trigger event (step 710), sending a request to data source to establish a connection therewith (step 720), and receiving an acknowledgement of the connection from the data source (step 730). The method 700 can include sending a request, to the data source, for data (step 740), receiving the data from the data source over the established connection (step 750), and providing the received data to the data collection engine 304 or the asset profiling engine 312 (step 760). The method 700 can include the data collection engine 304 or the asset profiling engine 312 processing the data (step 770), and storing the data in a memory cache (step 780) and or in database 306 (step 790).

The method 700 can include the scheduling engine 314 receiving or detecting an indication of a trigger event (step 710). For instance, for periodic or scheduled data collection events (e.g., scheduled or periodic events to profile assets or acquire data from external sources such as the vulnerability scanner(s) 230 or the databases 240, 250 or 260) the scheduling engine 314 can employ, for example, the Unix Cron process to time schedule initiation of execution of data acquisition. The Cron process can provide an indication to the scheduling engine 314 when the time for a data acquisition event arrives. In some instances, the scheduling engine 314 can receive an instruction from, for example, from the data collection engine 304, the controller engine 310 or the asset profiling engine 312 to initiate a data acquisition session/event with a given data source, such as a vulnerability scanner 230, an external database (e.g., database 240, 250 or 260) or an asset of the computing and network environment 210.

The method 700 can include the scheduling engine 314 sending a request to the data source to establish a communication link/channel therewith (step 720) and receiving an acknowledgement of the connection from the data source (step 730). The communication link can be a secure communication link. The scheduling engine 314 can send the request and receive the acknowledgement according to a data transfer protocol. The acknowledgement can be indicative of the successful establishment of the data link.

Upon receiving the acknowledgement, the scheduling engine 314 can send a request for the data to the data source (step 740), and receive the data over the data link (step 750). The scheduling engine 314 can receive a data query from the asset profiling engine 312 or the data collection engine 304, and forward the query to the data source over the communication link. The asset profiling engine 312 (or the data collection engine 304) can determine or select the data query based on, for example, the data source, the event triggering the data acquisition, or a combination thereof.

The scheduling engine 314 can forward the received data to the asset profiling engine 312 or the data collection engine 304, for example, depending on the nature of the data acquisition event (step 760). For example, if the data sources is an asset of the computing and network environment 210 (e.g., asset profiling event), the scheduling engine 314 can provide the data to the asset profiling engine 312, otherwise provide the data to the data collection engine 304. The data collection engine 304 or the asset profiling engine 312 can process the received data (step 770). Such processing can include filtering, eliminating redundancy, deriving or computing statistics' parameters, compressing data, eliminating non-reliable data, or a combination thereof. The data processing step 770 can be optional. The data collection engine 304 or the asset profiling engine 312 can provide the data for storage at a memory cache (step 780) or database 306. In some instances, the memory cache can be associated with the software bus 302. In some implementations, statistics (e.g., mean, variance, standard deviation, etc.) computed based on the received data can be stored at the database 306 or the memory cache. Storing few statistics instead of all the data in the database 306 can reduce the amount of storage memory used. Storing the data in the memory cache allows for fast access of the data by other entities of the CEMM system 220 and reduces Referring back to FIG. 3, the back-end system 222 can include a ranking engine 316 configured to compute ranking values for assets of the computing and network environment 210. The ranking value assigned to a given asset can be indicative of the importance of that asset to the mission and operation of the computing and network environment 210 and/or how critical the state(s) of that asset. The ranking engine 316 can deduce or quantify the importance of the asset based on, for example, one or more specification variables in specification profiles associated with the asset. For a given asset, the ranking engine 316 can use information such as the position of the asset's business owner (e.g., chief executive officer, engineer, secretary, etc.), the asset's high availability (HA) requirements, the asset's business requirements, the asset's SLA requirements, the type of data stored in the asset, other assets' dependency on the given asset, the like, or a combination thereof as indicators of the importance of that given asset. The ranking engine 316 can also use collected data (e.g., asset profiling data, vulnerability scanning data, and/or data from other sources such as databases 240, 250 or 260) to quantify or estimate how critical the state(s) of operation of the asset is/are. For example, the ranking engine 316 can employ asset resources (CPU, memory, hard disk storage, communication bandwidth, etc.) usage, vulnerability data, communication logs, as indicators of how normal or abnormal (e.g., with respect to intended design indicated in specification profiles) the state(s) of the asset is/are. The ranking engine 316 can employ, for example, a weighting sum (or other function) of a plurality of parameter values associated with one or more specification variables and profiling parameters to compute a ranking value of the asset. For variables that are not numbers, the CEMM system 220 can assign numbers to such variables for use in computing a ranking value.

In some implementations, the ranking engine 316 can compute a plurality of ranking values for a given asset. Each ranking value can be associated with a respective aspect (e.g., stress level, conformity with compliance requirements, conformity with security requirements, connectivity, conformity with design/intended redundancy, compliance with SLA requirements, compliance with business requirements, vulnerability, etc.) of the asset. The ranking engine 316 can continually update the ranking value(s) of each asset. For example, each time new data (e.g., profiling data, vulnerability scanning data, alerts, change made to specification profiles, or other data) relevant to an asset is received by the CEMM system 220, the ranking engine 316 can update the ranking value(s) associated with that asset. Specifically, the ranking engine 316 can, for a given asset, continually or regularly (e.g., responsive to receipt of new data/information relevant to that asset) compute/update ranking value(s) for that asset. Each ranking value can be computed based on a combination of parameters associated with that asset. Ranking value assigned to a given asset can be indicative of a priority, with respect to other assets, for addressing or fixing an issue (e.g., vulnerability, violation of a given requirement, misconfiguration, cyber security attack, cyber security threat, etc.) affecting that asset directly or indirectly. As such, ranking values for various assets can be viewed a priority ranked to-do list for operators of the computing and network environment 210, or for the CEMM system 220 if the issues are to be addressed automatically.

As an example, if the data collection engine 304 receives data indicative of a new discovered vulnerability, the controller engine 310 can identify a first set of assets directly affected by that vulnerability. Also, the controller engine can 310 identify a second set of assets that are dependent (e.g., with respect to one or more respective functionalities/operations) on assets of the first set. For example, client computing devices can be dependent on one or more Microsoft exchange servers for providing an email service, or on one or more web gateway devices for providing access to the web. The controller engine 310 can also identify a third set of assets that are dependent on assets of the second set. The ranking engine 316 can update (e.g., increase) ranking values of assets in the first set responsive to the received data indicative of the new vulnerability. The ranking engine 316 can also update ranking values of assets in the second set and the third set. After the update, assets in the first set will have relatively high rank value(s). Assets in the first set with high dependency (e.g., with relatively large number of assets in the second and third sets depending on them) or assets facing an external unknown environment (e.g., a firewall handling communications with external networks/entities) will have higher ranking values than other assets in the first set. As such, the ranking values of the affected assets can represent priorities for addressing or patching the vulnerability in each of these assets. Similarly, for an asset experiencing a misconfiguration or a reduction in its redundancy, or an asset flagged by another asset or system as sending abnormal traffic, the ranking engine 316 will increase the rank value(s) of such asset.

The back-end system 222 can also include a software bus 302 (also referred to as virtual bus). The software bus 302 can provide a shared software communication channel configured to facilitate connections and communication between various engines and modules of the CEMM system 220. While depicted as a single component in FIG. 3, the software bus 302 can include back-end component executing as part of the back-end system 222 and a front-end component executing as part of the front-end system 224. Each of these components can be associated with a respective bus engine for handling communication and transfer of data between various engines and modules.

When an engine or a software module of the back-end system 222 wants to redirect data to another entity in the front-end system 224 (e.g., the visualization engine 320), it can send a message to the software bus 302 indicative of the data (e.g., via a respective pointer) and the destination engine or module. The software bus 302 can then handle the transfer of the data to the destination engine or module. In some implementations, the software bus 302 can handle data transfer between different modules according to queue or a list of prioritized data transfer tasks.

The front-end system 224 can include a visualization engine 320 configured to handle display of asset data received from the back-end system 222. The visualization engine 320 can display data indicative of asset vulnerabilities, asset dependencies, asset stress levels (e.g., assets resources' usage levels), asset connections, asset dependencies, or any other asset information using a plurality of visual modes (or graphical/UI components). Each visual mode provides a different way of visual representing data. The visualization engine 320 can determine the shapes, sizes, and colors of graphical elements used to visually represent the data (e.g., assets and respective parameters/information) within each visual mode. The visual engine 320 can also accommodate user preferences by, for example, altering selected colors. The visual engine 320 can also switch between different visual modes or between different views within a single visual mode responsive to user commands.

The visual modes can include a grid (also referred to as heatmap) visual mode, a sphere visual mode, a nodes visual mode, a chord visual mode, a table visual mode, a charts visual mode, a multi-component visual mode, or a combination thereof. Each visual mode can be configured to show different aspects of the data or states of the computing and network environment 210. Each visual mode can provide visual filters to filter or sort displayed data. Visual modes can also provide visual controls to select one or more assets to view. Therefore, the Visual modes can provide users with flexibility with regard to what data portion to display and how. Such flexibility of visualizing data from different perspectives and at various granularities can help users navigate through and analyze large sets of data.

Figure 8A:
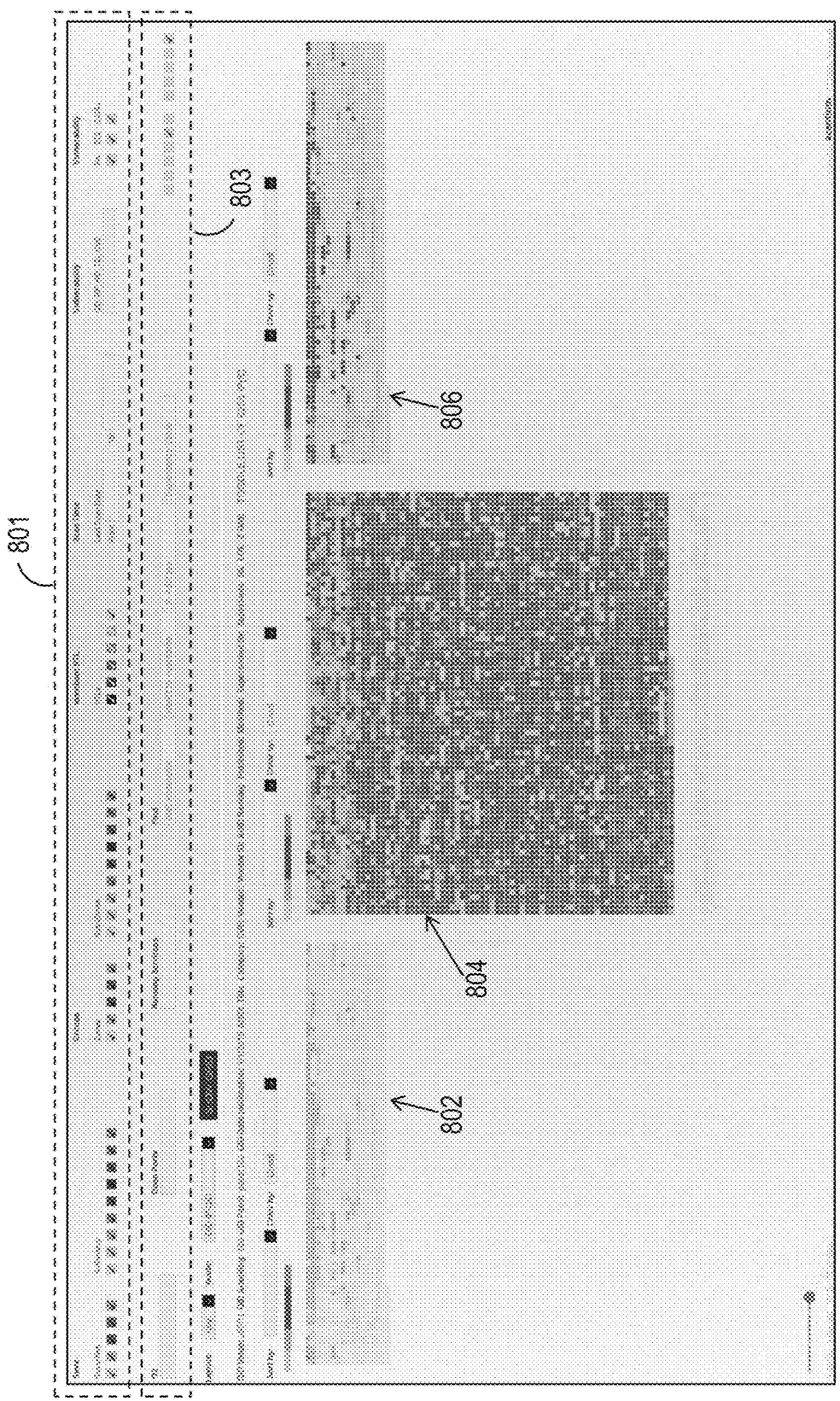
FIGS. 8A-8C show screen shots of user interface (UI) components corresponding to various visual modes of a display system.

FIG. 8A shows a screen shot of a grid user interface (UI) component corresponding to grid visual mode. In the grid visual mode, the visualization engine 320 can display the data in separate grids or arrays, with each grid representing correlated data according to specified relationship(s)/parameter(s). For instance, grid 802 can represent a set of vulnerabilities affecting the computing and network environment 210. Each cell (e.g. little square) in that grid represents a separate vulnerability. The color of each cell can be indicative of the severity of the respective vulnerability. Grid 804 can represent a set of assets of the computing and network environment 210. Each cell in grid 804 can represent a separate asset with the cell color representing, for example, the number of vulnerabilities affecting that asset. When a user selects one asset from grid 804, vulnerabilities affecting the selected asset can be displayed in grid 806. The color of each cell in grid 806 can represent the severity of the respective vulnerability.

The grid mode can provide a set of primary filters 801 and a set of secondary filters 803. The set of primary filters 801 can include, for example, a vulnerability severity filter for filtering vulnerability data based on respective severity levels. A user can select one or more severity levels and, in response, the visualization engine 320 can display only vulnerabilities with a severity level among the selected severity levels. The primary filters can include a ranking filter for filtering the vulnerability data based on asset ranking values. The user can select one or more asset ranking values and, in response, the visualization engine can display only assets with a ranking value among the one or more selected asset ranking values. The primary filters can also include zone and sub-zone filters to filter displayed vulnerability data based on asset categories and sub-categories. Asset categories can include, for example, servers, workstations, data centers, network appliances/devices, security assets (e.g., firewalls), or a combination thereof. Asset sub-categories can be defined, for example, based on geographic locations. In some implementations, the zone and sub-zone filters can be configured to filter displayed vulnerability data based on security zones and security subcategories of the assets. The primary filters 801 can also include a hold-the-line (HTL) filter for filtering displayed vulnerability data based on publication dates of vulnerabilities. For example, HTL30 can be indicative of vulnerabilities published within the last 30 days, HTL60 can represent vulnerabilities published within the last 60 days, and HTL90 can represent vulnerabilities published within the last 90 days. The primary filters 801 can also include a scanning date filter to filter displayed vulnerability data based on dates of latest vulnerability scans. For example, if the user selects certain dates, the visualization engine will display only vulnerability data associated with vulnerability scans performed within the selected dates. Another primary filter 801 can include a vulnerability classification filter. Vulnerability classifications can include, for example, vulnerabilities with a respective patch available (PA), end of life (EOL) vulnerabilities which are indicative of vulnerability for which no patches will be available, and/or zero-day (Z-day) vulnerabilities that are indicative of vulnerabilities with no patches available yet.

Primary filters 801 can be common to various visual modes when displaying the same type of data (e.g., data). However, primary filters 801 can vary based on the type of data (e.g., vulnerability data, asset connections data, asset dependencies data, etc.) displayed. Secondary filters 803 can be specific to a visual mode. Secondary filters 803 associated with the grid visual mode can include an OS filter to filter displayed vulnerability data based on asset operating systems. For example, the user can select to view only vulnerability data for assets associated with a specific operating system. Secondary filters 803 can also include an open ports' filter to filter the displayed vulnerability data based on assets with specific open ports. Another secondary filter 803 can include a running services' filter to filter displayed vulnerability data based on assets with specific services running thereon. Also, secondary filters 803 can include a search filter to identify one or more assets based on, for example, respective DNS hostname, NetBIOS hostname, IP address, or dependency value. The visualization engine 320 can be configured to display only vulnerability data associated with the identified assets.

Figure 8B:
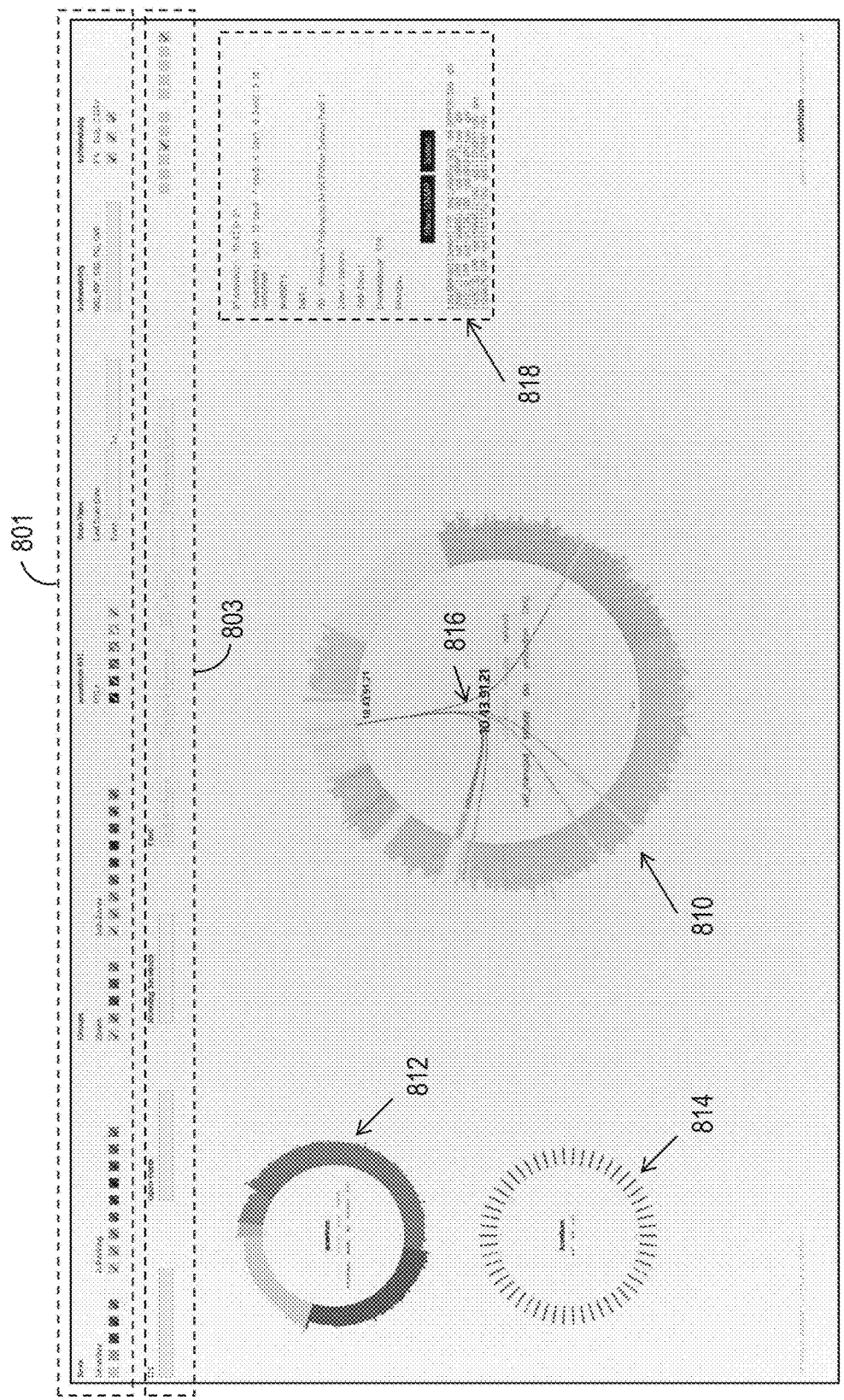

FIG. 8B shows a screen shot of a sphere UI component corresponding to a sphere visual mode. In a sphere visual mode, the visualization engine 320 can display data using circular (or hollow disc) shaped graphical objects, such as graphical objects 810, 812, and 814. Each of the graphical objects 810, 812 and 814 can be subdivided into segments. Each segment can represent a respective asset or data point (e.g., a specific vulnerability). For example, the colored segments of graphical objects 810 and 812 can represent separate assets of the computing and network environment 210. The graphical object 812 can represent information (e.g., vulnerability information) associated with all assets in the computing and network environment 210, whereas the graphical object 812 can represent information associated with a subset of assets defined based on the primary filters 801 and the secondary filters 803. The graphical object 814 can represent a subset of vulnerabilities (e.g., defined based on the primary filters 801 and the secondary filters 803) affecting assets of the computing and network environment 210.

The visualization engine 320 can represent several levels of dependent variables and associations (e.g., communication links between assets, dependency relationships between assets, etc.) in multiple hollow-disc-shaped graphical objects. The visualization engine 320 can represent associations and/or relationships between a selected asset (or a selected segment of graphical object 810) and other assets via curved lines 816 connecting the selected segment representing a selected asset to other segments representing other assets. Selecting a single segment within graphical object 812 can cause the visualization engine 320 to display expanded details 818 about the corresponding asset (or data point) on the right side of the sphere UI component, and display the IP address of the asset corresponding to the selected segment in the middle or center of the graphical object 812.

The sphere visual mode can include the same primary filters 801 as in the grid visual mode. The sphere visual mode can also include a set of secondary filters which may or may not be similar to secondary filters associated with other visual modes. Compared to the grid visual mode illustrated in FIG. 8B and the nodes visual mode illustrated in 8C, the sphere visual mode can be viewed as providing a more focused view (or lens) of the displayed data. Also, the sphere visual mode can be adequate for displaying data indicative of real-time varying relationships between various assets, such as communication links established between separate assets of the computing and network environment 210. For example, the visualization engine 320 can display changes in the curved lines 816 in real time as relationships (e.g., connections or dependencies) between the selected asset and other assets change over time. The colors of the segments in the graphical objects 810, 812 and 814 can be indicative of a number of vulnerabilities affecting each asset, a vulnerability severity level, a vulnerability classification, an asset category, an asset ranking value, or other parameters.

Figure 8C:
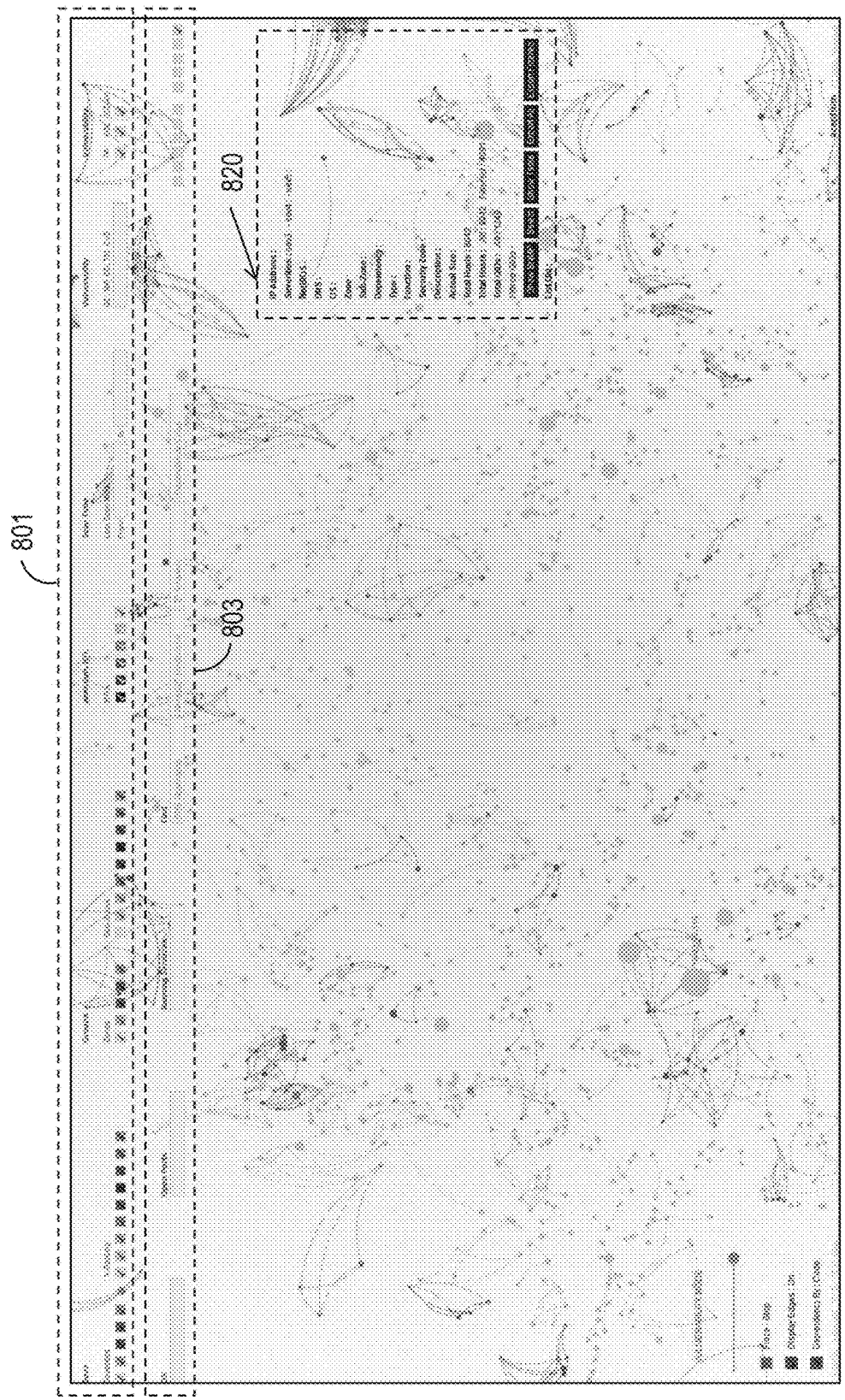

FIG. 8C shows a screen shot of a nodes UI component corresponding to a nodes visual mode. In the nodes visual mode, the visualization engine 320 can display data as nodes arranged into dynamic clusters. Each asset can be displayed as a dot (or node) which dynamically migrates in relation to other assets which share a specific set of criteria. The criteria can vary depending on the functional mode associated with a user (e.g., networking, vulnerability management, cyber security, compliance, etc.). The motion of the nodes is a controllable variable. The shape size or color of a given node can be indicative of characteristics of the corresponding asset, such as the number of vulnerabilities affecting the asset, the highest vulnerability severity level associated with the asset, the stress level associated with the asset, the asset ranking value, or other parameters. The visualization engine 320 can represent relationships or associations (e.g., communication links between assets, dependency relationships between assets, etc.) between separate assets using edges connecting respective nodes.

The nodes visual mode can include the same primary filters 801 as in the grid visual mode. The nodes visual mode can also include a set of secondary filters 803 which may or may not be similar to secondary filters associated with other visual modes. Selecting a node within the nodes UI component can cause the visualization engine 320 to display expanded details 820 about the corresponding asset on the right side of the nodes UI component. The expanded details 820 or 818 can include information of the selected asset, such as IP address, NetBIOS, DNS, OS, asset category (or zone), asset sub-category (or sub-zone), number of dependencies, number of vulnerabilities affecting the asset per severity level, IDs of vulnerabilities affecting the asset, or a combination thereof. Other parameters or information can be displayed within the expanded details of a selected asset.

Another visual mode can include a chord visual mode, which allows display of the data in a circular and a multi-layer format to visually represent a system's structure (e.g., structure of the computing and network environment 210 or a sub-system thereof). The visualization engine 320 can highlight relationships and links within the system through connecting lines between points throughout the structure. The variables used to show relationships or associations can be dynamic and subject to filtration. The visualization engine 320 can display a plurality of UIs associated with various visual modes simultaneously, for example, in multiple windows or in multiple display devices or screens associated with a client device 223.

The visualization engine 320 can also support a table visual mode for displaying data in a table format. Each row in a table graphical object can be associated with a respective asset or data point, whereas table columns can represent specific characteristics of the assets or data points. Primary and secondary filters can allow selection of the data portion to be displayed. Selecting an individual data point or asset can cause the visualization engine 320 to display expanded details on that data point or asset. Another visual mode can be a charts visual mode that enables display of data via multiple charts. Separate charts can be associated with respective parameters or characteristics of assets or data points.

The visualization engine 320 can allow exporting data displayed according to various visual modes into a comma separated values (CSV) file format, portable document format (PDF), or other file formats. The visualization engine 320 can also be configured to allow switching between various visual modes for a given set of displayed data. The visualization engine 320 can include a details module for displaying expanded details for selected assets or data points. When a data point or asset is selected within a given visual mode, the details module can cause display of a set of expanded details associated with that asset or data point. The details module can be configured to present the expanded details in different forms depending on the visual mode. Possible expanded detail information can include asset information (e.g., asset network information, asset vulnerability information, organizational information (ownership, function, etc.) or vulnerability information (e.g., name, ID(s), severity level, existing solutions/patches, etc.). In some implementations, the visualization engine 320 can allow a user, via the UI, to select the parameters or characteristics to be displayed by the details module.

The visualization engine 320 can also provide action controls allowing the user to initiate specific with respect to the displayed data. For example, action controls can allow the user to initiate actions taken upon one or more assets in real time, such as causing the CEMM system 220 to launch a vulnerability scan, ping an asset, profiling one or more assets, or delete a data portion. The action controls can also allow a user to export displayed data into one or more file formats.

Referring back to FIG. 3, the front-end system 224 can include a polarizing filtering engine 318 configured to manage loading data from the back-end system 222. In particular, when a client application is launched (or initiated) on a computing device 223 of the front-end-system 224, the polarizing filtering engine 318 can identify profile data associated with a user initiating the client application, or with a functional mode (e.g., indicative of the type of data associated with the client application). The polarizing filtering engine 318 can send the profile data or indications thereof to the controller engine 310, and the controller engine 310 can select and prepare a data portion (or data container) for sending back to the polarizing filtering engine 318. The polarizing filtering engine 318 can also manage the process of refreshing dynamic data displayed by the visualization engine. For example, if the visualization engine 320 is displaying current communication links associated with one or more assets, the polarizing filtering engine 318 manage the acquisition of real-time updates of the communication links data from the back-end system 222. Functions and tasks performed by the polarizing filtering engine 318 are discussed in further detail with respect to section E below.

C. Situational Awareness

According to example embodiments of this disclosure, the CEMM system 220 can assess the state(s) of operation of the computing and network environment 210 or assets thereof. The state(s) of operation of an asset (or of the computing and network environment 210) refer to how that asset (or the computing and network environment 210) is operating or functioning according to one or more criteria. For example, the state(s) of operation of a given asset can be indicative of whether the respective resources' usage (e.g., CPU usage, memory usage, communication bandwidth or communication ports usage, battery usage, or the like) is within expected ranges; whether the asset, or the computing and network environment 210, is operating according to compliance requirements, security requirements, business requirements, legal requirements, or any other requirements specified, for example, in the specification profiles; or whether the current asset configurations consistent with the respective configurations described in the specification profiles. The state of operation of an asset can be indicative of an abnormal behavior or a cyber security event (e.g., vulnerability, cyber security threat, cyber security attack, etc.) associated with the asset. The state of operation of an asset can also be indicative of a misconfiguration associated with the asset or software/hardware module(s) thereof.

The CEMM system 220 can be configured to continuously, or regularly, monitor and assess the state(s) of operation of the computing and network environment 210 or respective assets. The monitoring and assessment of the assets can allow the CEMM system 220 to be aware of the states and situations of the computing and network environment 210 as they change over time. Such awareness, can allow the CEMM system 220 to detect abnormal or unusual operational behavior (e.g., access of the computing and network environment 210 by blocked IP addresses, continuously high resources' usage in one or more assets, misconfiguration, or the like) as its occurs, and preemptively identify its root cause and address it. Also, it can allow the CEMM system 220 to react to cyber security events (e.g., security threats or attacks) and address them more reliably based on the knowledge of the operation state(s) of the computing and network environment 210.

Figure 9:
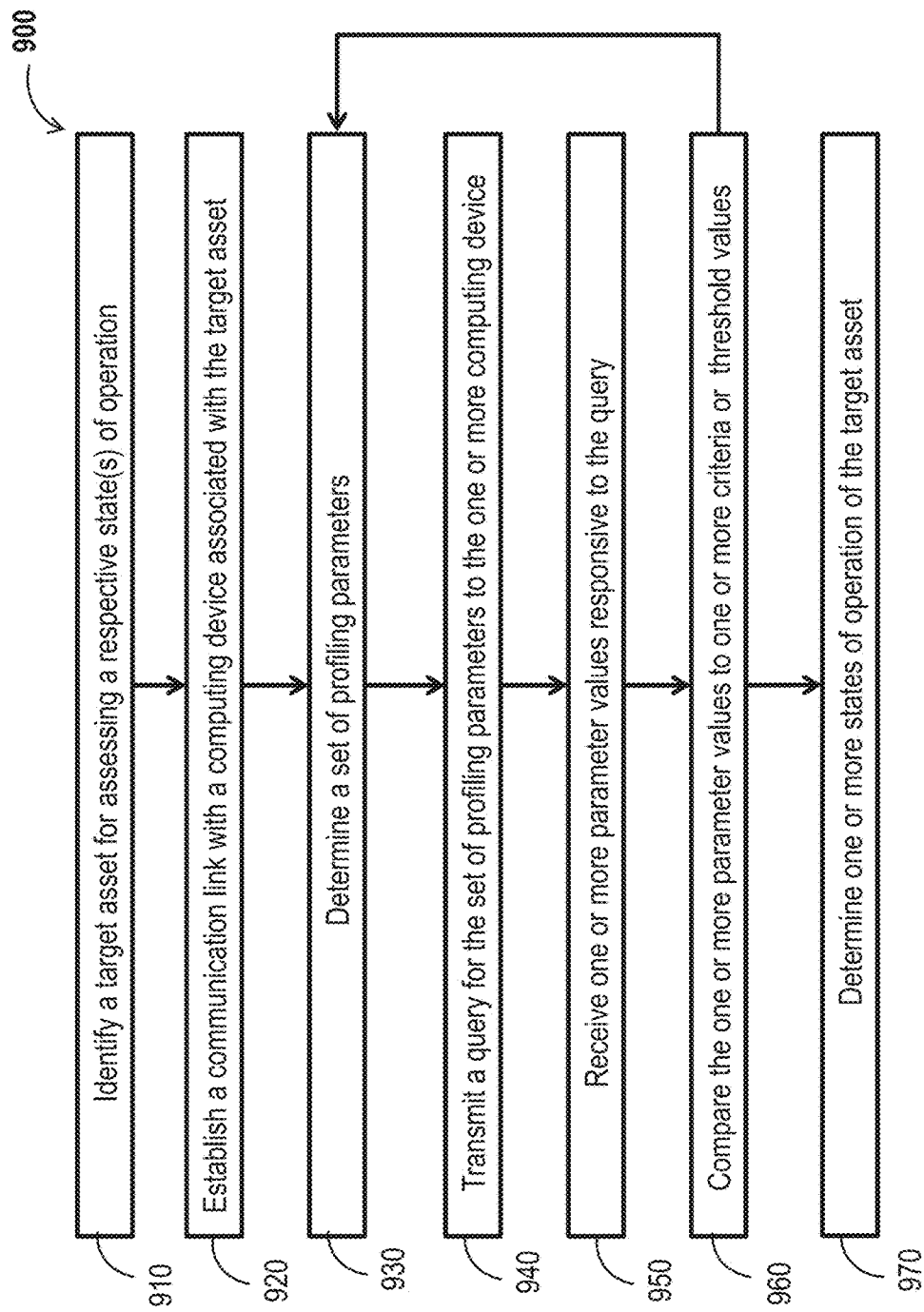
FIG. 9 shows a flowchart illustrating a method for monitoring and assessing a state of operation of the computing and network environment.

FIG. 9 shows a flowchart illustrating a method 900 for monitoring and assessing a state of operation of the computing and network environment. The method 900 can include identifying a target asset of the computing and network environment 210 for assessing respective states of operation (step 910) and establishing one or more communication links with one or more computing devices associated with the target asset (step 9200). The method 900 can include determining a set of asset profiling parameters (step 930), transmitting a query for the set of profiling parameters to the computing device(s) via the established communication link(s) (940), and receiving one or more parameter values responsive to the transmission of the query (step 950). The method 900 can include comparing the one or more parameter values to one or more criteria or threshold values (step 960) and determining a state of operation associated with the target asset based on the received one or more parameter values or the comparison of the one or more parameter values to the to one or more criteria or threshold values (step 970). The method 900 can include repeating steps 930-960 a number of times to profile the target asset according to a hierarchical profiling scheme to determine, for example, a cause of abnormal behavior associated with the determined state of operation of the target asset.

The method 900 can include the controller engine 310 (or the asset profiling engine 312) identifying a target asset of the computing and network environment 210 for profiling or assessing respective state(s) of operation (step 910). The controller engine 310 can identify the target asset based on, for example, timing information related to scheduled events (e.g., scheduled periodic asset profiling events or scheduled system assessment events), a detected event (e.g., abnormal or unusual behavior of the computing and network environment 210), a discrepancy in maintained or collected data (e.g., vulnerability scanning data, previous asset profiling data and/or specification profiles' data), a recently published cyber security threat or vulnerability, a received alert, the like, or a combination thereof. For example, the back-end system 222 can be configured to periodically or regularly profile some assets of the computing and network environment 210, for example, according to a respective profiling frequency. For example, when the profiling period elapses, the controller engine 310 can send an instruction to the asset profiling engine 312 to initiate profiling of the assets. The controller engine 312 can identify the target asset based on respective ranking value(s). For example, the controller engine 312 can identify assets with respective ranking values exceeding a given ranking threshold value for profiling.

In some instances, the controller engine 310 can detect that a given requirement (e.g., compliance, security, legal, business or other requirement) of the computing and network system 210 may be violated, and identify one or more assets associated with that requirement for profiling. For example, the controller engine 310 can detect (e.g., based on profiling data of a server 211) that an IP address that is flagged by a compliance requirement (e.g., the compliance requirement stipulates that some specific IP addresses or IP addresses associated with a geolocation should be denied access to the computing and network environment) has accessed the computing and network environment 210, and, in response, instruct the asset profiling engine 312 to profile the firewall, a gateway, a router, one or more other assets, or a combination thereof. In some other instances, the controller engine 310 can determine one or more assets that are affected with a vulnerability (e.g., based on vulnerability scanning data from vulnerability scanner(s) 230), or may be affected by a recently published vulnerability or other cyber security threat. In some instances, the controller engine 310 can identify one or more assets for profiling responsive respective information being requested for display (or being displayed) on a computer device 223 of the front-end system 224.

The method 900 can include the asset profiling engine 312 or the scheduling engine 314 establishing one or more communication links with one or more computing devices associated with the target asset (step 920). In some instances, the target asset can be the computing device itself. In some other instances, the target asset can be associated with a plurality of computing devices (e.g., a firewall or a software platform), or can be a component of (e.g., a software application installed in or a hardware component of) the computing device. The communication link can be a secure communication link or channel.

The method 900 can include the asset profiling engine 312 determining a set of profiling parameters (step 930). The set of profiling parameters can represent parameters to be requested from the target asset, such as asset information (e.g., IP address, MAC address, NetBIOS, etc.), asset configuration parameters, asset communication logs, asset CPU usage, packet drop rate, the like, or a combination thereof. In some implementations, determining the profiling parameters can include the asset profiling engine 312 selecting a profiling template for profiling the target asset. A profiling template can include (or represent) a query for sending to the target asset. In some implementations, the asset profiling engine 312 can determine the set of profiling parameters (or the profiling template) according to a hierarchical asset profiling scheme. The hierarchical asset profiling scheme can include multiple profiling templates, each associated with a respective profiling depth.

The method 900 can include the asset profiling engine 312 transmitting, via the one or more established communication links, a query to the one or more computing devices to request the determined profiling parameters (step 940), and receive, via the established communication link(s), data including one or more parameter values responsive to the query (step 950). The received parameter values can include, for example, communication logs of the target asset (or the communication devices) indicative of IP addresses with which the target asset communicated (or is communicating) for a given last period of time (e.g., the last few days, the last few hours, the last 60, 30 or 20 minutes, or any other time period), configuration data including hardware or software configuration parameters (e.g., browser settings, user access list, access level per user, etc.), CPU usage data (cumulative CPU usage, CPU usage per software module, cache memory usage values, etc.), network usage data, memory usage data, the like or a combination thereof.

The method 900 can include the asset profiling engine 312 comparing the one or more parameter values to one or more criteria or respective threshold values (step 960). The criteria can include requirements or specifications defined in the specification profiles associated with the target asset or the computing and network environment 210. For instance the criteria can include a list of blocked IP addresses or blocked Geo-IP addresses (e.g., IP addresses associated with a given geolocation) specified in a compliance profile, a list of encryption requirements (e.g., a list of data files, databases, or assets to be encrypted, encryption methods, or combination thereof) defined in one or more security profiles, redundancy requirements (e.g., number of replicas of the target asset, IDs of target asset replicas, etc.), or any other requirements or specifications associated with the target asset or the computing and network environment. Threshold values can include, for example, benchmark parameter values to determine whether an asset is under stress. For example, a CPU usage level of 95% or more for a period of time equal to or exceeding 10 mins can imply that the corresponding asset is under computational stress. Also, a packet drop rate threshold value that is exceeded for a respective threshold time period can imply (or be interpreted by the asset profiling engine) that the corresponding asset is under communication stress. In some implementations, the one or more criteria or threshold values can be specific to the target asset. For instance, for each asset of the computing and network environment 210, the CEMM system 220 (e.g., the controller engine 310) can define a respective set of criteria or threshold values for use in assessing the state(s) of operation of that asset. For example, the CEMM system 220 can define the criteria or threshold values for a given asset based on the specification profiles associated with that asset.

Comparing the one or more parameter values to the one or more threshold values or criteria can include computing (or generating) a set of deviation values (or deviation vectors or matrices) that represent the target asset's deviations from the respective specification variables and/or the respective threshold values. The computed deviation values can be used to detect substantial deviations from the specification profiles and alert operators of the computing and network environment 210. In particular, the computed deviation values can allow the CEMM system 220 to assess how well the target asset (and the computing and network environment is complying with the specification profiles. For example, based on such deviation values, the CEMM system 220 can determine whether the target asset was mistakenly or intentionally assigned to a wrong security zone. In such case, the controller engine 310 can identify the technical owner of the target asset based on respective specification profiles, and alert that owner with regard to the change in the security zone of the target asset. The CEMM system 220 can also determine based on the computed deviation values, for example, whether the target asset is redundant as it was designed (e.g., according to the respective redundancy profile) or did its redundancy system break.

In response to the received parameter values (or the computed deviation values), the controller engine 310 (or asset profiling engine 312) can determine one or more states of operation of the target asset (step 970). The one or more states of operation can be indicative of whether the asset is under stress (e.g., one or more resources' usage exceeding threshold value(s) for at least a specified time duration), whether a given requirement is violated, whether the asset is subject to a specific misconfiguration, whether the asset is subject to an ongoing cyber security attack, whether the asset is affected with a non-patched vulnerability, the like, or a combination thereof. Determining the state(s) of operation can include the asset profiling engine 312 or the controller engine 310 updating one or more state variables corresponding to the one or more determined states of operation. For example, for an asset that is used for financial live trading and is designed to be redundant and to execute transactions error free, the controller engine 310 can update the high-availability (HA) state variable of that asset to False if the asset's speed for synchronizing the data is not fast enough (e.g., synchronization speed below a respective threshold value). Setting the HA state variable to False makes the asset no longer HA available. The asset profiling engine 312 or the controller engine 310 can set the HA True or False (or 1 or 0) states based on, for example, what is an acceptable deviation from a desired synchronization speed. In some implementations, a number of state variables can be associated with each asset, such as a HA state variable, one or more stress level state variables, one or more security state variables. The back-end system 222 (e.g., the controller engine 310) can define such state variables based on the specification variables in the respective specification profiles. The asset profiling engine 312 can update the state variables associated with the target asset based on the parameter values received at step 950 or the comparison performed at step 960.

In some implementations, the ranking engine 316 can update a ranking value associated with the target asset based on the updated state variables. For example, an asset that is designed to be continuously live (e.g., on and responding) can have low tolerance for synchronization delay, while an archiving asset (or an asset associated with an archiving system would have a high tolerance for the same thing) can have a higher tolerance for synchronization delay. As such, a HA weight value can be associated with an asset based on, for example, the respective specification profiles. Such HA weight value can represent how important is high availability for that asset. The ranking engine 316 can update the rank value of the target asset based on the HA weight value of the target asset upon a change is determined in the HA status of the target asset. For example the ranking engine 316 can update a rank R of the target asset by incrementing R with (HA weight value×$\alpha$), where a is a real number.

The method 900 can include the asset profiling engine 312 (or the controller engine 310) determining a cause of an abnormal behavior (or undesired state) associated with the target asset or the computing and network environment 210. An abnormal behavior can include granted access to a blocked IP address, unusually high stress (e.g., relatively high resources' usage), misconfiguration, continuously generating high data traffic with one or more other assets, attempts to access blocked websites or databases, or the like. Examples of a cause of the abnormal behavior can include a non-patched vulnerability, a user modification to asset configuration, a software application associated with the target asset or settings thereof, an implementation of a requirement specified in the specification profiles, or the like.

In some implementations, the method 900 can include the asset profiling engine 312 looping back to step 930 to determine a second set of profiling parameters based on the result of the comparison at step 960. The asset profiling engine 312 can loop back to step 930 to perform a context-based hierarchical profiling scheme to determine a cause of the abnormal behavior. The asset profiling engine 312 can loop back to step 960 based on, for example, a decision profiling tree. The asset profiling engine 312 can transmit a second query to the one or more computing devices based on the second set of profiling parameters (step 940), receive one or more second parameter values responsive to the second query (step 950), perform a second comparison between the one or more second parameter values and one or more second criteria or threshold values (step 960). Based on the profiling decision tree, the asset profiling engine 312 may loop back again to step 930. In such case, the asset profiling engine 312 can determine a third set of profiling parameters based on the results of the second comparison, transmit a third query to the one or more computing devices based on the third set of (step 940), receive one or more third parameter values responsive to transmission of the third query, and compare the one or more third parameter values to one or more third criteria or threshold values.

Figure 10:
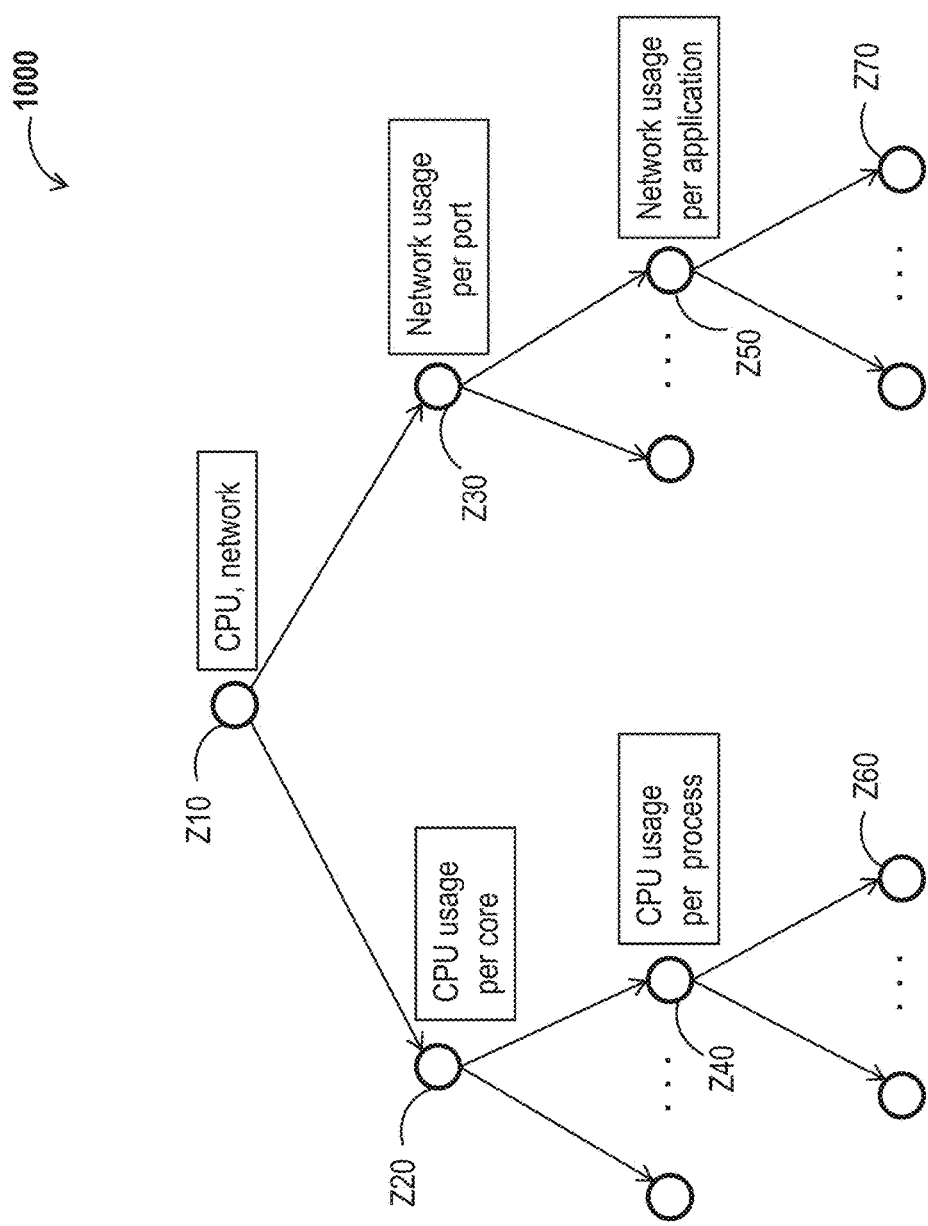
FIG. 10 shows a diagram illustrating a decision profiling tree indicative of a context-based hierarchical profiling scheme.

FIG. 10 shows a diagram illustrating a decision profiling tree 1000 indicative of a context-based hierarchical profiling scheme. The parent node 1010 can be associated with a respective first set of profiling parameters or a first profiling template. The first set of profiling parameters or the first profiling template can be indicative of a query for cumulative CPU usage and cumulative network usage. If the cumulative CPU usage exceeds a first CPU usage threshold value, then the decision will be to move to the node 1020. Node 1020 can be associated with a second set of CPU profiling parameters or a second CPU profiling template.

The second set of CPU profiling parameters or the second CPU profiling template can be indicative of a query for CPU usage per processor core. If CPU usage of a given processor core exceeds a third CPU usage threshold value, the decision will be to move to node 1040. Node 1040 can be associated with a third set of CPU profiling parameters or a third CPU profiling template. The third set of CPU profiling parameters or the third CPU profiling template can be indicative of a query for CPU usage per process with respect to the given processor core. At node 1070, the asset profiling engine 312 can compare CPU usage values for a plurality of processes to a fourth CPU usage threshold value.

Furthermore, node 1030 can be associated with a second set of network profiling parameters or a second network profiling template to be used for querying a respective asset if the cumulative network usage is found to exceed a respective network usage threshold vale. The second set of network profiling parameters or the second network profiling template can be indicative of a query for network usage per communication port. Also, node 1050 can be associated with a third set of network profiling parameters or a third network profiling template. The third set of network profiling parameters or the third network profiling template can be indicative of a query for application associated with a respective port and the network usage for each application associated with that port.

While the decision profiling tree 1000 illustrates a contextual hierarchical scheme based specific to CPU usage and network resources usage for a given asset, similar decision profiling trees can be defined by the CEMM system 220 for asset configuration, asset communication logs, or any other aspects of a given asset. Also, the profiling decision tree 1000 should not be interpreted as limiting whether in terms in the number and arrangement of respective nodes, or in terms of the query associated with each node. In particular, the number of profiling steps (or profiling queries) along any path in a profiling decision tree can vary based on, for example, the respective asset, the path, or a combination thereof. Such number of profiling steps (or profiling nodes) can be equal to 1 or any integer greater than 1. In some implementations, each asset among a plurality of assets can be associated with one or more respective profiling decision trees specific to that asset.

The asset profiling engine 312 can determine the cause of the abnormal behavior based on, for example, the last received parameter values (at step 950) or the last comparison (at step 960). In particular, the asset profiling engine 312 can determine the cause of the abnormal behavior based on a profiling decision tree (e.g., decision profiling tree 1000) associated with the target asset. For example, the asset profiling engine 312 can determine the abnormal behavior when reaching a leaf node (e.g., nodes 1060 or 1070 of FIG. 10). The leaf nodes of the profiling decision tree can include indications of possible causes based on, for example, received profiling parameter values responsive to the query associated with the respective parent node. For example, node 1060 of the profiling decision tree 1000 can include indications of possible causes of the abnormal behavior based on the CPU-usage-per-process values received from the target asset.

In some implementations, a profiling decision tree, such as profiling decision tree 1000, can cause the asset profiling engine 312 to profile a second asset. For example, instead of looping back from step 960 to step 930, the profiling engine 312 may determine at step 960 that another asset may be associated with an abnormal behavior exhibited by the currently profiled asset. The asset profiling engine 312 may, in response, initiate profiling of the other asset according the methods 600 and/or 900 described in FIGS. 6 and 9. For instance, if the other asset is not responding to a profiling query or a request to establish a communication link, the asset profiling engine 312 may employ querying by proxy as discussed with regard to step 660 of FIG. 6. If the other asset is responsive, the asset profiling engine 312 may directly profile the other asset according to a respective profiling decision tree.

In some implementations, the controller engine 310 can send an indication of the state(s) of operation, the abnormal behavior, the determined cause, the received profiling parameters, or a combination thereof to the front-end system 224 for display on a computer device 223. For example, the controller engine 310 can send an alert indicative of the target asset, the abnormal behavior, or the determined cause to a computer device 223 running a client application of the CEMM system 220. The controller engine 310 can provide state assessment data, e.g., one or more received parameter values, indication of the comparison(s) result(s), indication of the abnormal behavior, indication of determined cause, or a combination thereof of the target asset, for display on the computer device 223.

In some instances, the state(s) of operation can include the interconnection state(s) of the target asset. In such instances, if a client application of the CEMM system 220 is displaying interconnection states for a given asset (e.g., logical communication links or communication channels established between the given asset and other assets), the controller engine 310 can cause the asset profiling engine 312 to profile the given asset periodically (e.g., over periods of time in the range of seconds or minutes), determine interconnection states (e.g., established communication channels), and provide data indicative of the interconnection states for sending to the client application. If data related to an asset unknown to the CEMM system 220 is received, the profiling engine 312 or the controller engine 310 can save that data into a temporary memory bank until it is allocated to a known asset or a new asset is created. If interconnection data associated with the given asset is indicative of abnormal behavior, e.g., continuously high bandwidth usage or persistently high packet drop rate with respect to respective threshold values and time duration values, the asset profiling engine 312 can perform context-based hierarchical asset profiling as described above.

In some implementations, the assessment of state(s) of operation can include monitoring unused IP addresses of the computing and network environment 210 to identify potential intruders. For example, if there are 1000 IP addresses associated with of the computing and network environment 210 and only 900 of them are allocated to assets of the computing and network environment 210, the asset profiling engine can be configured to periodically or regularly ping the unused IP addresses to determine whether they are being used by any computer devices. If an IP address among the 100 IPs is determined to be used by a computer device, the asset profiling engine 312 may profile that computer device to determine whether it an undesired intruder or a new device added of the computing and network environment 210.

In some implementations, the assessment and visualization of states of operations of assets associated with the computing and network environment 210 can allow operators, system architects, or executives associated with the computing and network environment to identify issues in design and/or architecture of the environment 210 and address such issues. For example, real-time monitoring (e.g., using asset profiling data that is displayed in real time) of asset interconnections, asset resources' usage, or relationships/dependencies between various assets, operators can flag, for example, persistent undesired behavior. Also, if changes are made to the design or architecture of the environment 210, the real-time monitoring of states of operation can allow users to visualize the effects of the changes made on the operations of one or more assets or the environment 210 as a whole. The back-end system 222 can determine dependency parameters for a given asset based on specification profiles data (e.g., data indicative of interconnections between various assets), asset profiling data (e.g., indicative of installed software applications or communication logs of the asset), or other collected data.

D. Monitoring and Managing Vulnerabilities

A vulnerability can be a weakness or flaw associated with the design, implementation, or operation of a hardware or software asset or a group of assets. The weakness or flaw can provide opportunities of unauthorized intrusions to a computer environment (such as computing and network environment 210) employing hardware or software assets affected with the vulnerability. Vulnerability scanners 230 are tools for detecting vulnerabilities affecting computer environments or computer systems. The vulnerability scanner(s) 230 can scan, upon execution, the computing and network environment 210 to determine vulnerabilities affecting assets of the computing and network environment 210. Using results provided by the vulnerability scanner(s) 230, an operator of the computing and network environment 230 can manage and execute patching of the detected vulnerabilities.

Vendor databases 240, cyber security databases 250, authority databases 260, and/or other providers of cyber security data usually publish identified vulnerabilities. They also publish solutions or patches (e.g., pieces of software for fixing respective vulnerabilities) when available. A published data item (e.g., an electronic file or a portion thereof) indicative of a respective vulnerability can include an identifier of that vulnerability assigned by the publisher or other entity, a description of the vulnerability, a severity level, assets affected, or a combination thereof. The publishing of identified or known vulnerabilities puts operators of computer environments or computer system on notice. Also, such publishing leads providers of vulnerability scanners to update or upgrade their scanners based on newly published vulnerabilities. Furthermore, the publishing of vulnerability patches or solutions allows operators of the computing and network environment 210 (or other computer systems) to fix affected assets or mitigate the risk of the respective vulnerabilities.

However, the publishing of vulnerabilities also makes hackers and malfeasors aware of the respective weaknesses or flaws. As they become aware of such weaknesses or flaws, hackers and malfeasors can design or implement processes for exploiting the published vulnerabilities to access assets of the computing and network environment 210 and/or temper with resources thereof. As such, the earlier vulnerabilities associated with computing and network environment 210 are fixed or patched, the less likely they lead to actual attacks or successful intrusion attempts. However, the complexity of most computer environments or systems (e.g., in terms on the number of assets and respective interdependencies), the constraints associated with vulnerability patching (e.g., resetting, disconnecting or shutting down electronic devices or respective services), and/or the number of known or published vulnerabilities make the management of vulnerability patching a complicated multi-dimensional problem. In other words, while it may seem trivial and common sense to fix vulnerabilities as soon as respective patches are available, operational, business, legal, compliance, or security requirements associated with the computing and network environment 210 may impose complex constraints on the way the patching process is to be executed.

Furthermore, the deployment of vulnerability patches to the computing and network environment 210 can be a complicated and cumbersome process. For example, Microsoft can publish vulnerability patches on a monthly basis (e.g., one a month). Responsive to the monthly publication, system operators usually start managing and executing the patching of vulnerabilities affecting their computer systems. The patching process usually involves a considerable amount of a continuously changing automation to test and push these patches out while still complying with business continuity requirements. Also, once patched, affected assets must be assessed for any remaining vulnerabilities. Since the number of assets that are to be assessed (e.g., after patching) can be in the tens or hundreds of thousands, the prioritization of the patching and following assessments is highly desired to maintain business continuity while substantially reducing the risk of the respective vulnerabilities.

Systems and methods described herein provide comprehensive solutions for detecting vulnerabilities and respective affected assets, and managing asset priorities in terms of addressing or patching the detected vulnerabilities. The detection of affected assets or the assignment of asset priorities can take into account various factors and aspects (such as various requirements, design or architectural specifications or a combination thereof) of the computing and network environment 210, current state(s) of one or more assets, and/or information related to detected vulnerabilities. In particular, the systems and methods described herein can take into account, for example, asset inter-dependencies and/or inter-connections, asset redundancy information, asset configuration information, asset stress level information, or a combination thereof to determine the extent (e.g., in terms of the number of directly or indirectly affected assets, the importance of each affected asset to the operation and mission of the computing and network environment 210, the severity or risk associated with each detected vulnerability, etc.) to which the computing and network system 210 is affected by the detected vulnerabilities, and to manage asset priorities in addressing such vulnerabilities. As such, the systems and methods described herein can efficiently and reliably manage even large numbers (e.g., hundreds or thousands) of detected vulnerabilities by prioritizing, for example, assets with high importance (e.g., functional or dependency importance) or high severity vulnerabilities while still complying with requirements and regulations associated with the computing and network environment 210. Furthermore, the systems and methods described herein can substantially alleviate the burden associated with vulnerability from a monthly chore and massive monthly overhaul project, to regular task. Also, the systems and methods described herein allow for continuous monitoring and auditing of the computing and network environment with respect to addressing vulnerabilities.

Figure 11:
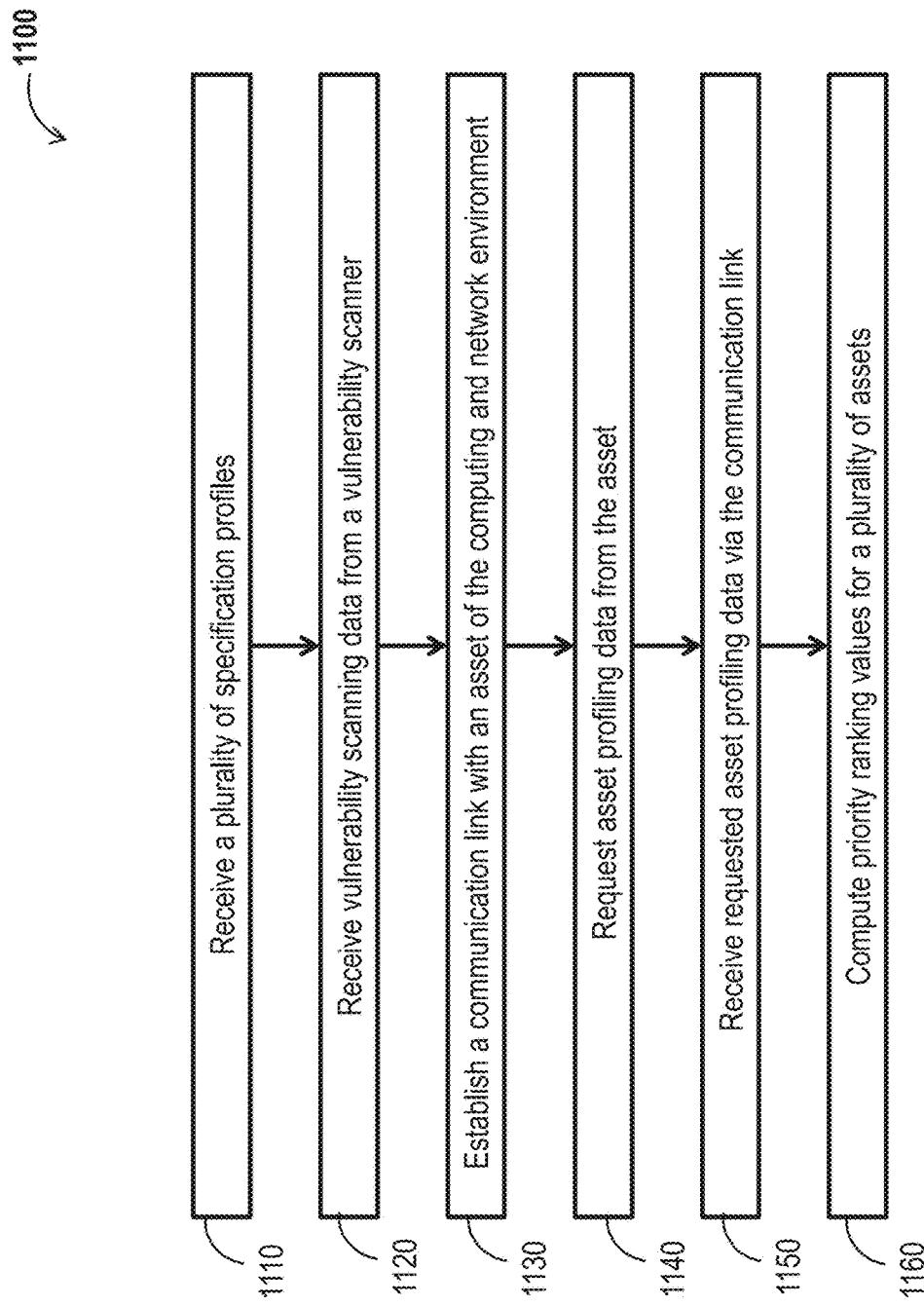
FIG. 11 shows a flowchart illustrating a method for determining priority levels for processing vulnerabilities associated with the computing and network environment.

FIG. 11 shows a flowchart illustrating a method 1100 for determining priority levels for addressing or processing vulnerabilities associated with the computing and network environment 210. The method 1100 can include receiving a plurality of specification profiles of the computer network (step 1110), receiving vulnerability data from a vulnerability scanner (step 1120), and receiving vulnerability data associated with the computing and network environment 210 from a vulnerability scanner (step 1130). The method 1100 can also include establishing one or more communication channels with tone or more assets of the computing and network environment 210 (step 1140), and receiving asset profiling data, via the established communication channel(s) from the one or more assets (step 1150). The method 1100 can also include computing, for each of a plurality of assets of the computer network affected with a vulnerability, a respective priority ranking value indicative of a level of addressing the vulnerability in that asset, using the specification profiles, the vulnerability data and the asset profiling data (step 1160).

The method 1100 can include the data collection engine 304 receiving specification profiles' data of the computer network (step 1110). As discussed above with regard to FIGS. 3 and 5, each of the specification profiles can include (or define) one or more specification variables indicative of specification parameters related to the design (or architecture), configuration, or requirements associated with the computer network or respective assets. The data collection engine 304 can receive the specification profiles' data via user input or from computer devices or databases associated with the computing and network environment 210. In some implementations, the data collection engine 304 can be configured to receive the specification parameters' data and arrange the received data into specification profiles as discussed with regard to FIGS. 3 and 5. In some implementations, the data collection engine 304 can generate one or more specification profiles for each of a plurality of assets of the computing and network environment 210. The specification profiles for a given asset can include information indicative of asset configuration, design, and/or architectural variables or information. In some instances, one or more specification profiles can be associated with the computing and network environment 210 or a respective subsystem.

The method 1100 can include the data collection engine 304 receiving vulnerability scanning data from a vulnerability scanner (step 1120). The data collection engine 304 can establish (or cause the scheduling engine 314 to establish) a communication link with the vulnerability scanner(s) 230 (e.g., as discussed with regard to FIG. 7 above). The data collection engine 304 can send a request to the vulnerability scanner(s) 230 to scan the computing and network environment 210 or respective assets for vulnerabilities. The request can be indicative of a full scan (e.g., to scan all assets or all computer devices in the computing and network environment 210) or a partial scan (e.g., to scan a subset of the assets or computer devices). In response, the vulnerability scanner(s) can perform the scan and send the vulnerability scanning data to the CEMM system 220. The vulnerability data can include information identifying scanned assets (e.g., IP address, MAC address, asset name, NetBIOS, OS, asset installed applications, software/hardware vendor(s), logs, configuration parameters, or a combination thereof), detected vulnerabilities (e.g., ID, severity level, patch if any, date published, publisher, or a combination thereof), assets affected by each vulnerability, or a combination thereof.

The data collection engine 304 can scan the received vulnerability scanning data to determine, for example, vulnerabilities affecting each asset of the computing and network environment 210, the severity level of each vulnerability, a classification of each vulnerability (e.g., whether or not a patch is available such as PA, EOL or Z-day), a publication date for each vulnerability. The data collection engine 304 can classify vulnerabilities based on respective publication dates, for example, according to HTL30, HTL60, and/or HTL90 classifications. The data collection engine 304 can also download or request patches (e.g., software instructions to fix respective vulnerabilities) if available. For example, the data collection engine 304 can determine links indicative of vulnerability patches in the received vulnerability scanning data. In response, the data collection engine 304 can use such links to download the vulnerability patches.

In some implementations, the data collection engine 304 can be configured to receive vulnerability scanning data from a plurality of vulnerability scanners, and merge the received vulnerability data, for example, as discussed with regard to FIGS. 4A and 4B. The data collection engine 304 can also receive, from one or more other data sources (e.g., databases 240, 250 or 260), data associated with published vulnerabilities, and supplement the vulnerability data from the vulnerability scanner(s) 230 with the data associated with published vulnerabilities. For example, the data collection engine 304 can adopt, for a given vulnerability, a severity level or a description provided by one of the data sources rather than that provided by the vulnerability scanner(s) 230.

The method 1100 can include the asset profiling engine 312 establishing (or causing the scheduling engine 314 establish) a communication link with a target asset of the computing and network environment 210 to profile the target asset (step 1130). The communication link can be a secure logic communication link. In some implementations, the asset profiling engine 312 can be configured to profile each asset scanned by the vulnerability scanner(s) 230 or each asset affected by a vulnerability. For instance, the asset profiling engine 312 or the controller engine 310 can scan the data received from the vulnerability scanner(s) 230 to identify assets listed therein or assets affected by one or more vulnerabilities. In some implementations, the controller engine 310, for example, can identify a discrepancy associated with the vulnerability scanning and or specification profiles' data. For example, the IP address of a given asset can be different in two vulnerability scanning data sets from two distinct vulnerability scanners 230. Also, values for a given specification variable can be different in a specification profile and received vulnerability scanning data. In such cases, the controller engine 310 can identify assets associated with such discrepancies and instruct the asset profiling engine 312 to profile the identified assets. Establishing the communication link can include the asset profiling engine 312 to cause the scheduling engine 314 (e.g., as described above with regard to FIG. 7) to establish the communication link.

The method 1100 can include the asset profiling engine 312 sending a profiling query to the asset via the established communication link (step 1140). As described above with regard to FIG. 9, the asset profiling engine 312 can determine or select a set of profiling parameters based on, for example, the asset to be profiled, the trigger event of the asset profiling, or other criteria. The asset profiling engine 312 generate the query based on the selected set of profiling parameters. In some instances, the asset profiling engine 312 can select a profiling template that is indicative of a query to be sent to the asset to be profiled. The asset profiling engine 312 can employ light asset profiling, hierarchical asset profiling, or any other profiling mode to profile the asset.

The asset profiling engine 312 can receive, from the asset, via the communication link, asset profiling data, responsive to the query (step 1140). The profiling data received from the asset can include parameter values corresponding to profiling parameters indicated in the request. If the profiling process was initiated responsive to a detected discrepancy, the asset profiling engine 312 or the controller engine 310 can update or assess the reliability of the vulnerability scanning data received at step 1120 using the received profiling data. For example, if three data sources have the same value for a given variable (e.g., similar within a % error/deviation), and the received profiling data confirms that value, the controller engine 310 can mark the variable value as a low error variable value. If, however, three (or other number of) data sources are reporting mismatching value for the variable, then the asset profiling engine 312 can take full control of polling this variable value from the asset, for example, by profiling the asset one or more times to provide a more reliable value of the variable. The asset profiling engine 312 can update the vulnerability data with the value received from the asset.

The method 1100 can include the ranking engine 316 computing a ranking value indicative of a priority of fixing the profiled asset with respect to one or more a vulnerabilities affecting the asset compared to other assets (step 1150). In particular, the ranking value can be indicative of a priority of pushing vulnerability patch(es) to the profiled assets compared to other affected assets. As discussed above with regard to description of the ranking 316 in relation to FIG. 3, the ranking engine 316 can compute the ranking values based on specification profiles' data associated with the asset, the received vulnerability data, and the profiling data. The specifications profiles' data can include parameters or information (e.g., business ownership, high availability, redundancy, dependency, other characteristics/requirements, etc.) indicative of the importance of the profiled asset to the mission and operation of the computing and network environment 210. For example, an asset with a high level of functional dependencies (e.g., a larger number of other assets depend on it for one or more of their functions or operations), can be perceived as an important asset that needs to be prioritized in terms of vulnerability patching. High severity vulnerabilities can be assigned higher weights in order for them to be prioritized. The received vulnerability data can include information indicative of the vulnerabilities affecting the asset such severity levels, which indicate how severe is each vulnerability in terms of associated risk. The asset profiling data can include information indicative of the state(s) of operation of the asset. For example, the asset profiling data can be indicative of at least one of a connectivity status parameter, memory usage parameter, processing power usage parameter, network resources' usage parameter, interconnections parameters, the like, or a combination thereof. Assets that suffer from abnormal behavior with respect to one or more aspects can be assigned higher weights than assets with normal states of operation.

Taking into account all these aspects of the asset in computing the ranking value(s) allows for comprehensive and reliable prioritizing approach in handling detected vulnerabilities. The ranking engine 316 can compute the ranking value as a weighted sum of multiple parameter values associated with the specification profiles, the received vulnerability data, and the received profiling data. In some implementations, the ranking engine 316 can compute the ranking value as a weighted sum of multiple parameter values associated with the specification profiles and the received vulnerability data. The CEMM system 220 can repeat the method 1100 for a plurality of assets (e.g., assets affected with vulnerabilities). The ranking engine 316 can compute ranking values for various assets of the computing and network environment 210, for example, each time new vulnerability scanning data is received from one or more vulnerability scanners or other data sources (e.g., databases 240, 250, or 260). The ranking engine 316 can also update the ranking values dynamically, for example, responsive to new received asset profiling data or other data indicative of changes in states of operation of one or more assets affected with the vulnerability, detected cyber security events (e.g., cyber security threats or attacks), or a combination thereof.

The controller engine 310 can be configured to provide the vulnerability data, the specification profile data, the profiling data, the priority ranking values, or portions thereof for display by a client application running on a front-end computer device 223. The controller engine 310 can store such data in a memory or cache memory and then instruct the software bus to transfer the data to the front-end system 224. In some implementations, the back-end system 222 can transfer the data to the front-end computer device 223 can be in real-time (e.g., immediately or within a second after computing the ranking values for one or more assets). For example, the method 1100 can be initiated responsive to a request from the client application running on the front-end computer device 223. In response, the back-end system 222 can perform the method 1100 and send collected data or computed ranking values to the front-end computer device 223. In some implementations, the data collection engine 304, or the controller engine 310 can compress the vulnerability data, the specification profile data, the profiling data, the priority ranking values, and/or portions thereof. The controller engine 310 can cause the compressed data to be sent to the client application running on a front-end computing device 223 for display. Compression of the data allows for fast transfer of the data and efficient use of the communication resources between the back-end system 22 and the front-end system 224. The controller engine 310 can also cause storage of the vulnerability data, the specification profile data, the profiling data, the priority ranking values, or portions thereof to be stored in the database 306.

In some instances, the controller engine 310 can be configured to automatically send vulnerability patches to various assets of the computing and network environment 210 according to a priority order defined based on the computed priority ranking values. For instance, the controller engine 310 can schedule vulnerability patching for a plurality of assets affected with the vulnerabilities indicated in the vulnerability data. The scheduling can be based on the computed ranking values, availability of the patches, business requirements associated with various assets, or a combination thereof. For instance, assets with higher ranking values can be scheduled to be patched before assets with lower ranking values. As the ranking values can be dynamically updated, the controller engine 310 can dynamically update the patching schedule responsive, for example, to changes in the ranking values.

E. Multi-Layer Caching of Data for Display

In monitoring the states of operation, vulnerabilities, and/or cyber security threats, the back-end system 222 can continually collect data (e.g., vulnerability data, asset profiling data, or data from other sources such as databases 240, 250 or 260). For example, the back-end system 222 can acquire data from a plurality of data sources at various time intervals or frequencies. For example, the controller engine 310 can define a frequency to refresh data (e.g., via asset profiling) associated with each asset based on the importance of that asset. The controller engine 310 can also set a frequency for receiving (or fetching) data from the vulnerability scanner(s) 230, the database(s) 240, 250, or 260, or other data sources. Also, the controller engine 310 can trigger data acquisition (e.g., asset profiling, vulnerability scanning, fetching databases) responsive to one or more events, such as data requests from the front-end system 224, vulnerability or abnormal behavior detection, publication of new vulnerability or cyber security threat, received alerts, detection of violation of one or more requirements, or a combination thereof.

The amount of data collected by the back-end system 222, even over a short period of time, can be significantly large, especially for a large computing and network environment 210 (e.g., with thousands, tens of thousands or hundreds of thousands of assets). Such large amount of data can pose significant technical challenges with respect to storage, access, and transfer of the collected data. For instance, as the amount of data collected increases over time, it may exhaust the storage capacity of the back-end system 222. Furthermore, as the amount of data stored increases, fetching and access of the stored data may require more processing power and may become slower. In addition, transfer of large amounts of data to the front-end system 224 for display may call for repetitive and power consuming data fetching (at the front-end-system 224), for example, as the visualization engine 320 switches between visual modes or UI views. Accordingly, display of the data may suffer latency at the front-end system 224.

Systems and methods described herein allow for efficient and fast transfer of data from the back-end system 222 to the front-end system 224. These systems and methods also allow for real time display of data associated with one or more assets as such data is acquired by the back-end system 222. Specifically, the CEMM system 220 can allow for real-time updating of data displayed by the front-end system 224. For example, if data associated with a given asset (e.g., an asset with a relatively high ranking value, a relatively high stress level, or an abnormal behavior) is being displayed by the front-end system 224, the back-end system 222 can simultaneously acquire updates of that data (e.g., via asset profiling, triggering vulnerability scanning, or fetching external databases) and send data updates immediately to the front-end system 224. As such, users of the front-end system 224 can visually monitor various aspects of the computing and network environment 210 or respective assets in real time (e.g., as states of operation for one or more assets change over time).

The back-end system 222 can be configured to compress acquired or computed data for storage (e.g., in a memory or in the database 306) or for transmission to the front-end system 224. The controller engine 310 can cause a compression module to compress the data into compressed data segments. For example, the controller engine 310 can generate, for each time interval of a defined duration, a respective data segment, and cause the compression module to compress that data segment. For instance, the controller engine 310 can generate data segments corresponding to data acquired in successive intervals of one hour duration, 30-minutes duration, or any other duration.

Generating the data segments can include eliminating data redundancy (e.g., by merging data from various data sources as described with regard to FIGS. 3A and 3B) or arranging the data according to a given scheme. For example, the controller engine 310 can generate a data segment as a collection of data sub-segments associated with, for example, distinct assets or distinct functional aspects. The functional aspects can be associated with different types of operators monitoring the computing and network environment 210 (e.g., network operator(s), cyber security operator(s), compliance operator(s), etc.) who may be interested in different portions of the data. For example, network operators may be interested mainly in data indicative of communications and data traffic between various assets, whereas cyber security operators may be interested mainly in data indicative of vulnerabilities, abnormal behavior, or any potential cyber security threat. Arranging the data into data segments or data sub-segments can improve the speed of fetching or decompressing the data. Upon receiving a data request indicative of a data time period from the front-end system 224 (or a client application thereof), the controller engine 310 can fetch only data segments corresponding to that data period. Also, the controller engine 310 can compress the data sub-segments within a given data segment independently to allow for partial decompression (e.g., decompressing only that data sub-segment.

For each data segment, the controller engine 310 can compute one or more statistical parameters each corresponding to a respective set of data values. For example, for CPU usage values, cache memory usage values, bandwidth usage values, or data packet drop rate values in the data segment, the controller engine 310 can compute respective mean, variance, standard deviation or median values. The controller engine 310 can replace data values in a data segment with respective statistical parameter values, for example, once a certain time period (e.g., one day, one week, one month, or any other time period) passes after generating that data segment. In other words, as data gets old, the controller engine 310 can delete a portion of it and replace it with respective statistical values. The use of statistical values instead of the whole set of data allows for significant reduction in the amount of memory storage used by the back-end system 222 or the amount of data transmitted to the front-end system 224. Also, the use of the statistical values can allow for fast display or analysis of data corresponding to a relatively long time period (e.g., corresponding to a plurality of old data segments). The controller engine 310 can store the modified data (e.g., with the statistical values replacing data portions) in the data base 306 as historical data. In some implementations, the back-end system 222 can store the data segments in compressed or uncompressed form in the database 306 or in a random access memory (RAM).

Figure 12:
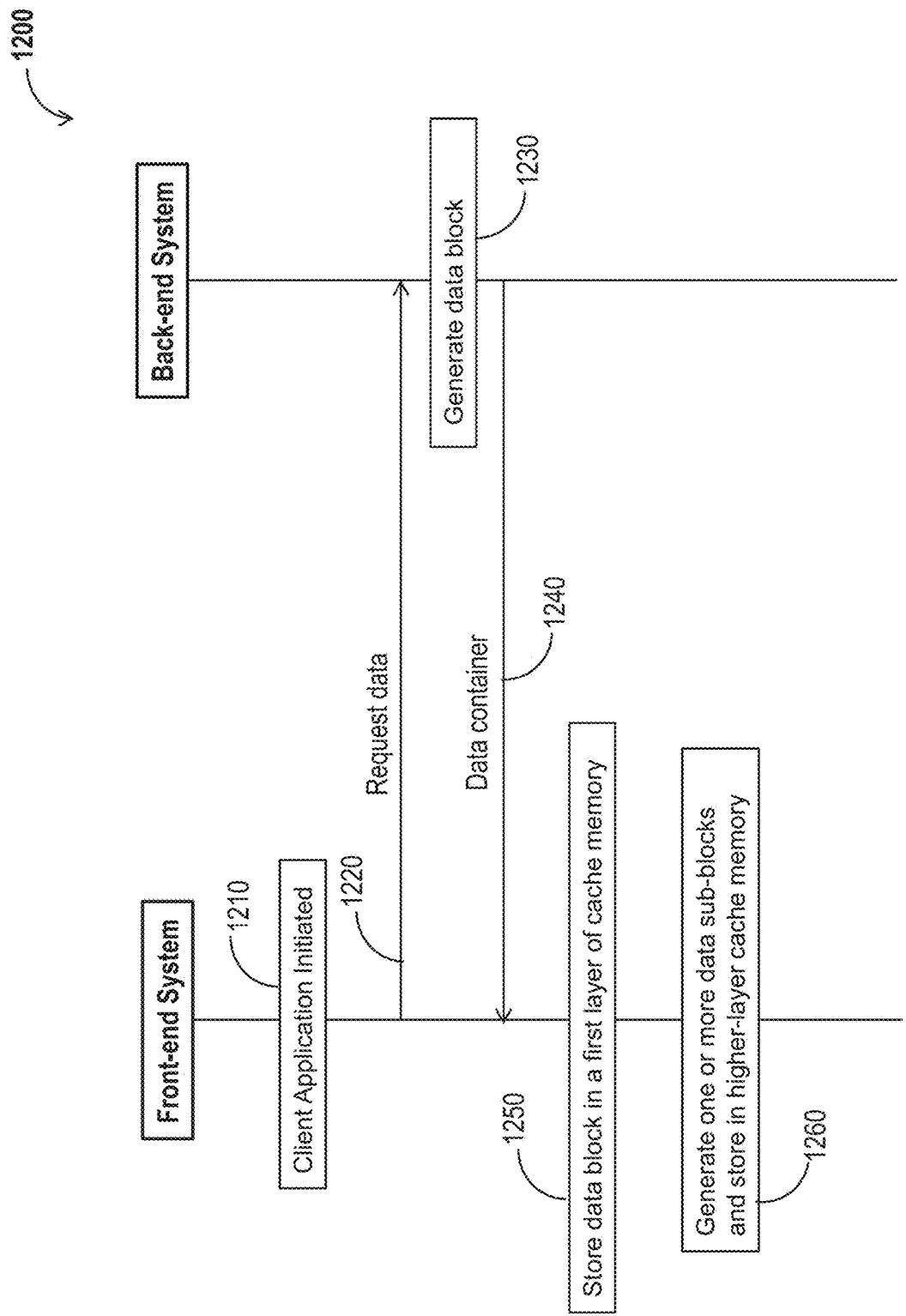
FIG. 12 shows a signaling diagram illustrating a method of acquiring data for display.

FIG. 12 shows a signaling diagram illustrating a method 1200 of acquiring, by the front-end system 224, from the back-end system 222, data for display. The method 1200 can include initiating a client application at the front-end system 224 (step 1210) and requesting data for display from the back-end system 222 (step 1220). The method 1200 can include the back-end system 222 generating a data block responsive to the request of data (step 1230), and sending the data block to the front-end system 224 (step 1240). The method 1200 can include the front-end system 224 storing the data block in a first layer of cache memory (step 1250), and generating one or more data sub-blocks based on the data block and storing them in one or more higher layers of the cache memory (step 1260). As used herein, a data block can include a data file.

Figure 13:
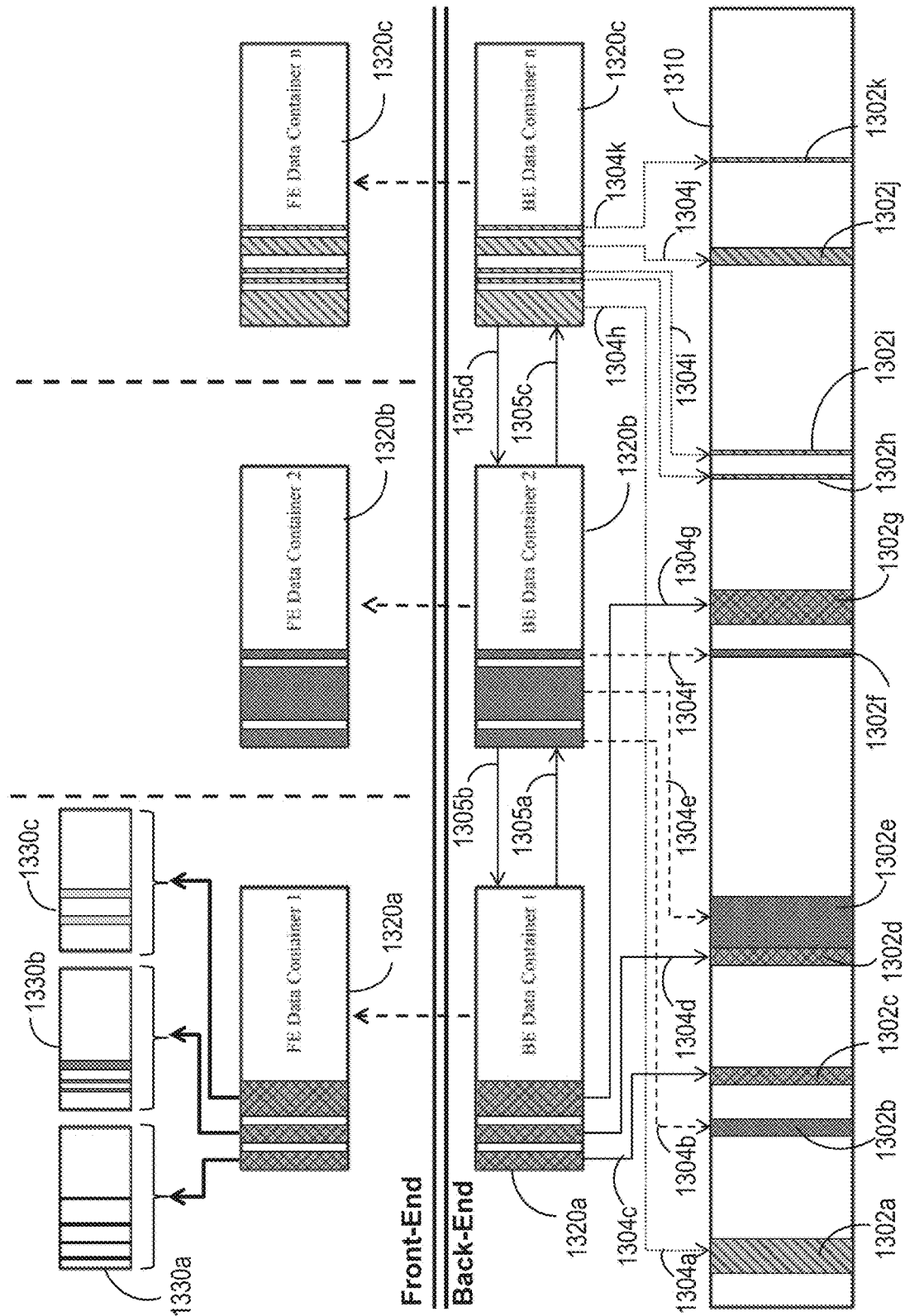
FIG. 13 is a block diagram illustrating data blocks and data sub-blocks including data for display.

FIG. 13 is a block diagram illustrating data blocks and data sub-blocks associated with the back-end system 222 and the front-end system 224. In particular, the back-end system 222 can generate data blocks 1320a-1320c (referred to herein individually or in combination as data blocks 1320) based on the acquired data 1310 for sending to the front-end system 224. A front-end computing device 223 can generate sub-blocks 1330a-1330c (referred to herein individually or in combination as data sub-block(s) 1330) based on data associated with a received data block 1320a, and store that data block 1320 and the generated data sub-blocks 1330 at different layers of a cache memory.

Referring back to FIGS. 12 and 13, the method 1200 can include a client device 223 initiating a client application associated with the CEMM system 220. The client application can include a software application, which when executed enables (or causes) the client device 223 to communicate with the computer server 221 (or the back-end system 222), receive data from the back-end system 222, and display the received data, for example, according to one or more of the visual modes described above with regard to FIGS. 8A-8C. A user of the client device 223 can initiate (or launch) the client application. The initiation of the client application can include the client device 223 receiving, via a respective UI, user authentication input data, such as login name and password, biometric authentication data, barcode scan data, the like, or a combination thereof.

The client device 223 can identify a user profile based on the user authentication input data. The user profile can include a user identifier (ID), an indication of a user access level, user location information, a functional mode with the user, one or more visual modes, or a combination thereof. The functional mode can be indicative of functional aspects of the computing and network environment 210 or a type of data of interest to the user. For example, the functional mode can be indicative of network monitoring, cyber security monitoring, compliance monitoring, system architecture monitoring, system load monitoring, the like, or a combination thereof. For a user who is a network monitoring operator of the computing and network environment 210, the corresponding user profile can be indicative of network monitoring as the respective functional mode. Also, the user profile of a user responsible for monitoring compliance of the computing and network environment 210 can be indicative of compliance monitoring as the respective functional mode. The functional mode, for a user, can be indicative of the type of data that user would be most likely interested in when he initiates a client application. The user profile information can include an indication of a plurality of cache memory layers of the client device 223 on which the client application is running. For example, the user profile information can include indication(s) of the number of layers, the storage capacity of each layer, or a combination thereof. The user profile information can also include information indicative of hardware or software characteristics of the client device 221 (or the front-end system 224) on which the client application is running.

The method 1200 can include the client device 223 sending a data request to the back-end system, responsive to the initiation of the client application (step 1220). The data request can include user profile information, such as user ID, user functional mode, user access level, user location information, one or more visual modes associated with the user, or a combination thereof. In some implementations, the data request can be an indication of the initiation of the client application by the user identifiable via the user profile information. For example, the polarizing filter engine 318 can retrieve user profile data stored in the client device 223, generate a data request, and send the generated data request to a computer server 221. In some implementations, the polarizing filter engine 318 can insert indications of specific data in the data request.

The client application can provide the user with an UI to specify the type(s) of data (e.g., in terms of scope, or timing) he is interested in when setting his user profile or when making a data request. For example, the provided UI can allow the user to select specific time intervals, specific assets, specific functional aspects of the computing and network environment 210, specific geographic location, or a combination thereof. In some instances, the client application, Upon launch on the client device 223, can prompt the user to select a functionality profile or an expertise vector for which data is to be acquired from the back-end system 222 and displayed. Functional profiles or expertise vectors can include general, network, cyber security, storage, risk, business, legal, or compliance. Each of these functional profiles or expertise vectors can represent a separate angle for monitoring the computing and network environment 210. In particular, each of the functional profiles or expertise vectors can be associated with a respective data container to be acquired from the back-end system 222. The polarizing filter engine 318 can incorporate an indication of user's selection in the data request.

The method 1200 can include the server application generating a data block (also referred to herein as data container 1320) for transmitting to the client application (step 1230). Responsive to the data request, the computer server 221 (or the back-end system 222) can initiate (or launch) a server application for handling data requests from the client application. The server application can include the engines of the back-end system described with regard to FIG. 3. The controller engine 310 can determine a portion of the acquired data 1310 stored in a memory (e.g., a random access memory (RAM)) or in database 306 to generate the data block.

The controller engine 310 can identify data segments and/or sub-segments that are related to the user's functional profile. For example, if the user's functional profile is indicative of cyber security monitoring, the controller engine 310 can identify data segments or sub-segments including data related to vulnerabilities and affected assets, potential cyber security threats, abnormal behavior or activity associated with one or more assets, the firewall, or a combination thereof. For example, the controller engine 310 can identify data segments 1302c, 1302d, and 1302g to incorporate in data block 1320a. The controller engine 310 can identify data segments 1302b, 1302e, and 1302f to incorporate in data block 1320b. The controller engine 310 can identify data segments 1302a and 1302h-1302k to incorporate in data block 1320c.

The controller engine 310 can also identify data segments or sub-segments that relate to recent events or alerts, such as recently detected cyber security threat(s), recently published vulnerabilities and potentially affected assets, recent asset outages (e.g., servers or devices of the computing and network environment 210 that recently went down or non-responsive), assets abnormal behavior (e.g., assets under stress or generating unusual traffic), or a combination thereof. The controller engine 310 may identify data segments or sub-segments that relate to recent events or alerts independently of the user functional mode or the user profile information. The controller engine 310 may be configured to send data indicative of recent events or alerts or a portion thereof (e.g., those associated with a given geographic location) to all, or a group of, users regardless of their functional modes or regardless of the functional aspects of the computing and network environment 210 they may be interested in. For example, a data block for a network operator may include data related to recent cyber security alerts or recently detected threats in addition to data indicative of interconnections and traffic between various assets.

The back-end system 222 or the controller engine 310 can generate a data block (or data container) based on user functional profile (or expertise vector) information indicated in the data request or associated with the user. Generating a data block specific to the user of the client application or to a group of users sharing similar functional profiles allows rapid data access and rapid data transfer. In particular, defining the data to be fetched and transmitted by the back-end system 222 based on the functional profile information or expertise vector information allows the controller engine 310 to fetch and transmit only data that is relevant to the user of the client application, and therefore, allow for efficient use of computational and communication resources associated with the back-end system 222 or a computer server 221 thereof.

The controller engine 310 may create and maintain a set of data pointers indicative of the data block 1320. Each data pointer can be pointing to a respective identified data segment or sub-segment. For example, the controller engine 310 may create data pointers 1304c, 1304d, and 1304g pointing, respectively, to data segments 1302c, 1302d, and 1302g in generating data block 1320a. The controller engine 310 may create data pointers 1304b, 1304e, and 1304f pointing, respectively, to data segments 1302b, 1302e, and 1302f in generating data block 1320b. The controller engine 310 may create data pointers 1304a and 1304h-1304k pointing, respectively, to data segments 1302a and 1302h-1302k in generating data block 1320c. The back-end system 222 may store or maintain created pointers for a data block instead of storing the data block 1320 itself. The controller engine 310 may create one or more pointers associated with a data block 1320 to point to one or more other existing data blocks (or to pointers thereof). For example, pointer 1305a is used to define data block 1320a and it points to data block 1320b (or pointer thereof). Also, pointers 1305b and 1305c are used to define data block 1320b and they point to data blocks 1320a and 1320c, respectively. In fact, each of pointers 1305a-130d is a pointer of one data block and is pointing to a data portion or a pointer of another data block.

Data blocks 1320a, 1320b, and 1320c can be associated with separate users, separate client applications, or separate types of functional profiles. The controller engine 310 may be configured to maintain a single set of pointers associated with a corresponding data block for users sharing the same functional profile. The controller engine 310 may update the set of pointers (e.g., to point to distinct data segments or sub-segments) as new data is acquired by the data collection engine 304 or the asset profiling engine 312. For example, if the data block 1320a is defined to include vulnerability data associated with the latest vulnerability scan, the controller engine 310 can update the set of pointers upon new vulnerability scan data is received by the data collection engine. The controller engine 310 may delete the set of pointers associated with a data block if no corresponding user is logged in or no corresponding client application is running. Before deleting the set of pointers, the controller engine 310 may update pointers pointing to that set of pointers in other data blocks to have them point to data segments in the acquired data 1310 stored in memory or data base 306. Maintaining a set of pointers defining a data block instead of a storing and maintaining a copy of that data block allows for memory storage reduction at the back-end system 222. Also, updating a set of pointers as new data is acquired by the data collection engine 304 or the asset profiling engine 312 can be faster than retrieving new data segments and updating the corresponding data block. In some implementations, the back-end system 222 can store and maintain a copy of the data block 1320 instead of maintaining pointers defining that data block 1320.

The controller engine 310 can generate a data block (e.g., data block 1320a) based on the identified data segments or sub-segments for sending to the client application. In generating the data block 1320a, the controller engine 310 can retrieve data segments or sub-segments (e.g., data segments 1302c, 1302d, and 1302g) pointed to by pointers of data block 1320a (e.g., pointers 1304c, 1304d, and 1304g). The controller engine 310 can combine the retrieved data segments or sub-segments into a single data block or data container. The controller engine 310 may tag each data segment or sub-segment in the data block with corresponding metadata. The metadata for a given data segment or sub-segment can include a priority indicator, a ranking value, date or timing information, one or more asset IDs, or a combination thereof. The priority indicator for a given data segment or sub-segment can be indicative of a priority (or relevance) level. The priority (or relevance) level can represent, for example, the likelihood of display of corresponding data at the client application side or how relevant is the corresponding data to the user of the client device. For example, the controller engine 310 may assign a relatively high priority level to data associated with a given asset that is regularly monitored by the user of the client application. The controller engine 310 may assign a relatively high priority level to data segments or sub-segments associated with high ranking values. The controller engine 310 may, for example, assign a highest priority level to data segments or sub-segments that include data related to recent and critical events, such as new cyber security threats with high severity levels, outages of assets with high dependencies, or detected violations of one or more compliance, security or business requirements. In some implementations, the controller engine 310 may arrange data segments and/or sub-segments in the data block 1320a according to respective priority levels. In some implementations, each priority level may correspond to a cache memory layer of the client device 223. The tagging of data segments or sub-segments with respective metadata may be optional.

The method 1200 can include transmitting the data block to the client device 221 (step 1240). The controller engine 310 can compress the generated data block 1320 before transmitting to the client device 223. The controller engine 310 can store the data block 1320a in a cache memory associated with the software bus 302 and provide an indication of the destination of the data block 1320a. The software bus 302 can transmit the data block 1320a to the client device 223. At the client device 223, the polarizing filter engine 318 or the visualization engine 320 can access the data block 1320a for processing.

The method 1200 can include storing the data block 1320a in a first cache memory layer (or a RAM) of the client device 223 (step 1250). The polarizing filter engine 318 or a decompression module can decompress the data block 1320a and store it a first layer cache or a RAM of the client device. For example, depending on the size of the data block 1320a and the storage capacity of the first layer cache, the polarizing filter engine 318 can decide where to store the data block 1320a. If the storage capacity of the first layer cache is large enough to store the data block 1320a, the polarizing filter engine 318 may store the data block 1320a in the first layer cache.

The method 1200 can include generating one or more data sub-blocks such as data sub-blocks 1330a-1330c, referred to hereinafter individually or collectively as data sub-block(s) 1330, based on data of the data block 1320a, and storing the generated data sub-block(s) in a second cache memory layer of the client device 223 (step 1360). The polarizing filter engine 318 (or the visualization engine 320) can generate one or more data sub-blocks 1330 representing data subsets of the data block 1320a. The polarizing filter engine 318 (or the visualization engine 320) can scan the data block 1320a (e.g., in decompressed form), for example, to identify data segments or sub-segments, respective metadata (e.g., priority indicators), or data values in the data block 1320a.

The polarizing filter engine 318 (or the visualization engine 320) can generate one or more data sub-blocks, such as data sub-blocks 1330a-c, using data from the data block 1320a. For instance, the polarizing filter engine 318 (or the visualization engine 320) can generate a data sub-block 1330 for each visual mode. The polarizing filter engine 318 (or the visualization engine 320) can compute graphical parameter (or display data) values associated with each visual mode using data from the data block 1320a. For example, with regard to the grid UI shown in FIG. 8A, the polarizing filter engine 318 (or the visualization engine 320) can compute matrices (or data arrays) corresponding to grids 802 and 804 when no primary or secondary filters 801 and 803 are applied (e.g., computing cell values for all assets with regard to grid 804 and computing cell values for all vulnerabilities with regard to grid 802). Also, with regard to the sphere UI in FIG. 8B, the polarizing filter engine 318 (or the visualization engine 320) can compute all segment values graphical objects 812 and 814 when no filtering is applied. With respect the nodes UI shown in FIG. 8C, the polarizing filter engine 318 (or the visualization engine 320) can compute values associated with all nodes (or all assets) and values representing edges between different nodes (or assets). The polarizing filter engine 318 (or the visualization engine 320) can group the computed graphical parameters for each visual mode in a respective data sub-block 1330. For example, data sub-blocks 1330a-c can be associated with the grid, sphere, and nodes UIs, respectively.

The polarizing filter engine 318 (or the visualization engine 320) may generate one or more other data sub-blocks that include expanded details (e.g., grid 806 or expanded details 818 and 820) associated with one or more assets of the computing and network environment 210. The polarizing filter engine 318 (or the visualization engine 320) may generate a separate expanded data sub-block for each visual mode. In an expanded data sub-block associated with a respective visual mode, the polarizing filter engine 318 (or the visualization engine 320) may include expanded detail data for all assets, or may include expanded detail data only for a subset of assets (e.g., assets with a ranking value exceeding a given threshold value). The one or more other data sub-blocks may include, for example, data indicative of recent cyber security events or threats related to one or more assets of the computer environment, alerts, asset outages, detected abnormal behavior associated with one or more assets, detected breach of one or more specification requirements (e.g., security, compliance or legal requirements), or a combination thereof.

In some implementations, the polarizing filter engine 318 (or the visualization engine 320) may construct the data sub-blocks 1330 in a different way than described above. The polarizing filter engine 318 (or the visualization engine 320) may group data segments or sub-segments associated with the same priority level into a respective data sub-block 1330. For example, considering priority levels from one to four, the polarizing filter engine 318 can generate data sub-block 1330a associated with priority level two, sub-block 1330b associated with priority level three, and sub-block 1330c associated with priority level four. The polarizing filter engine 318 may omit generating a data sub-block 1330 associated with the lowest priority level.

The polarizing filter engine 318 or a cache manager can store the data block 1320a and the generated data sub-block(s) 1330 in a plurality of cache memory layers. The polarizing filter engine 318 or the cache manager can store the data block 1320a and the data sub-blocks 1330a-1330c in separate cache memory layers of the client device 223. For example, the polarizing filter engine 318 (or the cache manager) can store the data bock 1320 in a first cache memory layer, and the data sub-blocks 1330 associated with various visual modes in a second cache memory layer that has a higher data access rate, higher average data access rate, higher data access speed, or higher average data access speed than the first cache memory layer. The polarizing filter engine 318 (or the cache manager) may store another set of generated data sub-blocks (e.g., data sub-blocks including expanding details data) in a third cache memory layer that has a higher data access rate, higher average data access rate, higher data access speed, or higher average data access speed than the first and second cache memory layers. In some implementations, the third cache memory layer may have a higher data access rate, higher average data access rate, higher data access speed, or higher average data access speed than the first cache memory layer, but a lower data access rate, lower average data access rate, lower data access speed, or lower average data access speed than the second cache memory layer.

Generating (or computing) data sub-blocks including data indicative of various graphical features for separate visual modes and storing such data sub-blocks in distinct cache memory layers of the client device 223 allows for improved display speed at the client device. For example, having data sub-blocks representing display da associated with various visual modes available in cache memory allows the visualization engine to switch relatively fast between distinct visual modes responsive to user request (e.g., upon user selecting to switch from a first visual mode to a second visual mode). Also, having expanded detail data available in a high speed cache memory allows quick retrieval of expanded detail data associated with a given asset upon selection of that asset by the user of the client device 223. The size of the data block 1320*a* may be large (e.g., larger than or equal to 0.5, 1 or 2 mega Bite (MB)). Generating the data sub-blocks upfront and storing them in a multi-layer cache prevents display delays that may occur due fetching the whole data block 1320 and computing display data parameters each time the user interacts with the displayed UI.

The client device 223 can have a multi-tier (or multi-layer) cache memory that includes a level-1 (L1) cache, level-2 (L2) cache, and level-3 (L3) cache. The L2 cache can have the highest data access speed, the L1 cache can have the second highest data access speed, and the L3 cache can have the third highest data access speed. Furthermore, the L3 cache can have larger storage capacity than the L1 or the L2 caches. The polarizing filter engine 318 (or the cache manager) can store the data block 1320*a* in the L3 cache, and store the generated data sub-blocks in the L1 and L2 caches. For example, the polarizing filter engine 318 (or the cache manager) can store data sub-blocks 1330 including display data associated with separate visual modes in the L1 cache, and store data sub-blocks including expanded detail data in the L2 cache. If no separate data sub-blocks for expanded data are generated, the polarizing filter engine 318 (or the cache manager) can store the data sub-blocks 1330 including display data associated with separate visual modes in the L2 cache.

In the case where data sub-blocks are generated based on priority levels of data segments or sub-segments, the polarizing filter engine 318 (or the cache manager) can store, for example, data sub-block 1330*c* associated with the highest priority in the L2 cache which has the highest data access speed, and store the data sub-blocks 1330*a* and 1330*b* in L1 cache. In some implementations, the polarizing filter engine 318 can store the data block 1320*a* in the RAM, and store the data sub-blocks 1330*a*-1330*c* in the L1, L2, and L3 caches, respectively.

A person skilled in the art should appreciate that the client device 223 can have any number of cache memory layers. Accordingly, the polarizing filter engine 318 (or the visualization engine 320) may generate any number of data sub-blocks, or any number of sets of data sub-blocks, from the received data block 1320*a*. The polarizing filter engine 318 (or the visualization engine 320) may store each data sub-block or each set of data sub-block in a separate cache memory layer. The polarizing filter engine 318 may store data sub-blocks including data associated with relatively high priority (or relevance) levels, relatively high ranked assets, or high likelihood of being requested by the user in a relatively higher access speed cache memory layer, compared to other data sub-blocks including data associated with relatively lower priority (or relevance) levels, relatively lower ranked assets, or lower likelihood of being requested by the user.

The visualization engine 320 can access the data sub-blocks 1330 from the respective cache layers to display on one or more display devices (e.g., display screens) associated with the client device 223. For example, upon the user of the client device selecting via a UI (e.g., a UI associated with a respective visual mode) to display data associated with a given data sub-block, the visualization engine 320 can receive a respective data request from the UI and retrieve that data from the cache memory layer storing that data sub-block and provide the data to the display device for display.

For a multi-core processor, each core processor can have its own L1 and L2 cache memories while the L3 cache can be shared by all processor cores. The polarizing filter engine 318 or the cache manager can store the data block 1320*a* in the L3 cache, and store the generated data sub-blocks 1330 in L1 and L2 caches associated with more than one processor core. For example, the polarizing filter engine 318 or the cache manager can store data sub-block 1330*b* in a L2 cache of a first processor core and data sub-block 1330*c* in a L2 cache of a second processor core. In some implementations, the total number of priority levels may be equal to the total number of cache memory layers in the client device 223, such that each cache memory layer can be associated with a respective priority level. The data storage arrangement where high priority data is stored in cache memory layers with relatively high access speed allows data with higher priority to be displayed at a higher speed than relatively low priority data.

When displaying data on the client device 223, the client application may send indications of navigation actions to the back-end system 222. For example, as a network operator navigates and focuses on one or more network assets, the client application can relay that information back to the server application or the back-end system 222. The server application can predict other data to be sent to the client application depending on which navigation tree the user of the client application has followed. For example, the relay of such information can be indicative of (or interpreted by the back-end system 222 as) a request for continuous updates regarding the one or more network assets. In response, the back-end system 222 or the server application can perform asset profiling for the one or more network assets repeatedly.

The server application or back-end system 222 can send the acquired asset profiling data in real time (immediately after the data is acquired), via the software bus 302, to the client application. The controller engine 310 may keep track of data associated with each cache memory layer on the client device side. As new asset profiling data becomes available, the controller engine 310 can store such data in a cache of the software bus 302, and set the destination address as the client device 223 hosting the client application or a cache memory layer (e.g., L2 cache) of the client device storing data associated with one or more network assets. The software bus 302 can have high speed components and a relatively low speed components in both the back-end or server side and the front-end or client side. At the back-end system 222, the high speed component of the software bus 302 can cause the asset profiling data to be transmitted to the client device 223. At the client device 223, the high speed component of the software bus 302 can update data stored at the L2 cache with the received asset profiling data, therefore, allowing display of the received asset profiling data in real-time (e.g., within few second from the time of acquisition of the data). The relatively slower component of the software bus 302 can also update the data block 1320*a* with the received asset profiling data.

Each method described in this disclosure can be carried out by computer code instructions stored on computer-readable medium. The computer code instructions, when executed by one or more processors of a computing device, can cause the computing device to perform that method.

While the disclosure has been particularly shown and described with reference to specific embodiments, it should be understood by those skilled in the art that various changes in form and detail may be made therein without departing from the spirit and scope of the invention described in this disclosure.

While this disclosure contains many specific embodiment details, these should not be construed as limitations on the scope of any inventions or of what may be claimed, but rather as descriptions of features specific to particular embodiments of particular inventions. Certain features described in this specification in the context of separate embodiments can also be implemented in combination in a single embodiment. Conversely, various features described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

What is claimed is:

1. A system for monitoring states of operation of assets in a network of computer devices, the system comprising:
   one or more servers communicatively coupled to a computer network, the one or more servers include:
   a controller engine executed on one or more processors, coupled to a memory, and configured to:
   detect that a specification associated with operation of the computer network is violated;
   identify one or more assets of the computer network associated with the specification; and
   an asset profiling engine configured to, for each asset of the one or more identified assets:
   determine a first set of parameters for profiling the asset based on detected violation of the specification;
   transmit a first query for the first set of parameters to a computing device associated with the asset;
   receive, from the computing device, one or more first parameter values corresponding to the first set of parameters responsive to the first query;
   compare the one or more first parameter values to one or more first criteria or threshold values; and
   determine a state of operation of the asset based on comparing the one or more first parameter values to the one or more first criteria or threshold values, the state of operation indicative of a normal or an abnormal behavior associated with the asset,
   the controller engine configured to determine a cause of violating the specification based on one or more determined states of operation of the one or more identified assets.

2. The system of claim 1, wherein the asset profiling engine is further configured to:
   determine a second set of parameters based on the comparing, for each of the one or more identified assets, of the one or more first parameter values to the one or more first criteria or threshold values;
   transmit, for each asset of the one or more identified assets, a second query for the second set of parameters to the computing device associated with the asset;
   receive, from each asset of the one or more identified assets, one or more second parameter values corresponding to the second set of parameters, responsive to the second query;
   compare, for each asset of the one or more identified assets, the one or more second parameter values to one or more second criteria or threshold values; and
   determine, for each asset of the one or more assets, the state of operation of the asset further based on comparing the one or more second parameter values to the one or more second criteria or threshold values.

3. The system of claim 1, wherein determining a first set of parameters for profiling the asset includes selecting a respective profiling template from a plurality of profiling templates.

4. The system of claim 1, wherein the controller engine is further configured to:
   provide an indication of an abnormal behavior of at least one asset of the one or more identified assets or an indication of the cause of violating the specification for display on a display device.

5. The system of claim 1, wherein the asset is a first asset and wherein the controller engine is further configured to:
   identify a second asset; and
   upon determining that the second asset is not responding to one or more requests, transmit the first query for the first set of parameters to the first asset, the first set of parameters associated with the second asset.

6. The system of claim 1, wherein detecting that the specification associated with the operation of the computer network is violated includes detecting access of the network of computer devices by an electronic device associated with an Internet Protocol (IP) address that is blocked from accessing the network of computer devices.

7. The system of claim 6, wherein the one or more identified assets include a firewall, a gateway or a router.

8. The system of claim 1, wherein the cause of violating the specification includes a misconfiguration or a modified configuration of an asset of the one or more identified assets.

9. The system of claim 1, wherein detecting that the specification associated with the operation of the computer network is violated includes detecting an attempt to access a blocked website or blocked database from the computer network.

10. The system of claim 1, wherein the controller is configured to update a state parameter of an asset of the one or more identified assets based on the state of operation of the asset.

11. A method of monitoring states of operation of assets in a network of computer devices, the method comprising:
  detecting by a controller engine executed on one or more processors, coupled to a memory, that a specification associated with operation of the
  identifying, by the controller engine, one or more assets of the computer network associated with the specification;
  determining, by the asset profiling engine, for each asset of the one or more identified assets, a first set of parameters for profiling the asset based on detected violation of the specification;
  transmitting, by the asset profiling engine, for each asset of the one or more identified assets, a first query for the first set of parameters to a computing device associated with the asset;
  receiving, by the asset profiling engine, for each asset of the one or more identified assets, one or more first parameter values corresponding to the first set of parameters responsive to the first query;
  comparing, by the asset profiling engine, for each asset of the one or more identified assets, the one or more first parameter values to one or more first criteria or threshold values;
  determining, by the asset profiling engine, for each asset of the one or more identified assets, a state of operation of the asset based on comparing the one or more first parameter values to the one or more first criteria or threshold values, the state of operation indicative of an abnormal behavior associated with the asset; and
  determining, by the controller engine, a cause of violating the specification based on one or more determined states of operation of the one or more identified assets.

12. The method of claim 11 further comprising:
  determining, by the asset profiling engine, a second set of parameters based on the comparing, for each of the one or more identified assets, of the one or more first parameter values to the one or more first criteria or threshold values;
  transmitting, by the asset profiling engine, for each of the one or more identified assets, a second query for the second set of parameters to the computing device associated with the asset;
  receiving, by the asset profiling engine, from each of the one or more identified assets, one or more second parameter values corresponding to the second set of parameters from the computing device associated with the asset, responsive to the second query;
  comparing, by the asset profiling engine, for each of the one or more identified assets, the one or more second parameter values to one or more second criteria or threshold values; and
  determining, for each asset of the one or more assets, the state of operation of the asset further based on comparing the one or more second parameter values to the one or more second criteria or threshold values.

13. The method of claim 11, wherein determining a first set of parameters for profiling the asset includes selecting a respective profiling template from a plurality of profiling templates.

14. The method of claim 11 further comprising:
  providing, by the controller engine, an indication of an abnormal behavior of at least one asset of the one or more identified assets or an indication of the cause of violating the specification for display on a display device.

15. The method of claim 11, wherein detecting that the specification associated with the operation of the computer network is violated includes detecting access of the network of computer devices by an electronic device associated with an Internet Protocol (IP) address that is blocked from accessing the network of computer devices.

16. The method of claim 15, wherein the one or more identified assets include a firewall, a gateway or a router.

17. The method of claim 15, wherein the cause of violating the specification includes a misconfiguration or a modified configuration of an asset of the one or more identified assets.

18. The method of claim 15, wherein detecting that the specification associated with the operation of the computer network is violated includes detecting an attempt to access a blocked website or blocked database from the computer network.

19. The method of claim 15, further comprising updating a state parameter of an asset of the one or more identified assets based on the state of operation of the asset.

20. A non-transitory computer-readable medium with computer code instructions stored thereon, the computer code instructions when executed by one or more processors cause the one or more processors to:
  detect that a specification associated with operation of the computer network;
  identify one or more assets of the computer network associated with the specification;
  determine, for each asset of the one or more identified assets, a first set of parameters for profiling the asset based on detected violation of the specification;
  transmit, for each asset of the one or more identified assets, a first query for the first set of parameters to a computing device associated with the asset;
  receive, for each asset of the one or more identified assets, one or more first parameter values corresponding to the first set of parameters responsive to the first query;
  compare, for each asset of the one or more identified assets, the one or more first parameter values to one or more first criteria or threshold values;
  determine, for each asset of the one or more identified assets, a state of operation of the asset based on comparing the one or more first parameter values to the one or more first criteria or threshold values, the state of operation indicative of an abnormal behavior associated with the asset, and
  determine a cause of violating the specification based on one or more determined states of operation of the one or more identified assets.

* * * * *